(12) United States Patent
Hilbert et al.

(10) Patent No.: US 11,079,661 B2
(45) Date of Patent: Aug. 3, 2021

(54) SYSTEM AND METHOD FOR CAPTURING IMAGES

(71) Applicant: Basler AG, Ahrensburg (DE)

(72) Inventors: Ines Hilbert, Ahrensburg (DE); Ralf Brachmann, Ahrensburg (DE); Sven Seeger, Ahrensburg (DE); Jan Henning Holm, Ahrensburg (DE)

(73) Assignee: Basler AG

( * ) Notice: Subject to any disclaimer, the term of this patent is extended or adjusted under 35 U.S.C. 154(b) by 0 days.

(21) Appl. No.: 16/570,115

(22) Filed: Sep. 13, 2019

(65) Prior Publication Data

US 2020/0103728 A1  Apr. 2, 2020

(30) Foreign Application Priority Data

Sep. 28, 2018  (DE) ...................... 10 2018 124 015.5

(51) Int. Cl.
| | |
|---|---|
| *G03B 17/06* | (2021.01) |
| *G03B 17/18* | (2021.01) |
| *G06T 7/557* | (2017.01) |
| *G06K 9/00* | (2006.01) |
| *G06T 7/11* | (2017.01) |
| *G06K 9/46* | (2006.01) |
| *G06K 9/62* | (2006.01) |

(52) U.S. Cl.
CPC ............ *G03B 17/18* (2013.01); *G03B 17/06* (2013.01); *G06K 9/00624* (2013.01); *G06K 9/4661* (2013.01); *G06T 7/11* (2017.01); *G06T 7/557* (2017.01); *G06K 2009/6213* (2013.01)

(58) Field of Classification Search
USPC ............................................. 396/89
See application file for complete search history.

(56) References Cited

U.S. PATENT DOCUMENTS

| | | | | |
|---|---|---|---|---|
| 9,294,687 | B2* | 3/2016 | Nikkanen | H04N 5/2351 |
| 2005/0264682 | A1* | 12/2005 | Kurane | H04N 5/2352 |
| | | | | 348/362 |
| 2009/0003678 | A1* | 1/2009 | Cutler | H04N 5/2353 |
| | | | | 382/132 |
| 2009/0167928 | A1* | 7/2009 | Asukabe | H04N 5/2356 |
| | | | | 348/345 |
| 2017/0005017 | A1* | 1/2017 | Tsujikawa | G03F 9/7088 |
| 2017/0339326 | A1* | 11/2017 | Rycenga | H04N 5/2252 |
| 2018/0191934 | A1* | 7/2018 | Song | H04N 5/2353 |

\* cited by examiner

*Primary Examiner* — Clayton E. LaBalle
*Assistant Examiner* — Warren K Fenwick
(74) *Attorney, Agent, or Firm* — Lerner, David, Littenberg, Krumholz & Mentlik, LLP

(57) ABSTRACT

A system and a method for the system, wherein the system includes a camera and a control unit for controlling the camera, which is formed by an associated image sensor for optically capturing a capturing region, wherein the control unit may switch between a first mode and a second mode as a function of a scene change in the recording space.

20 Claims, 11 Drawing Sheets

SYSTEM AND METHOD FOR CAPTURING IMAGES

FIELD OF THE INVENTION

The invention relates to a system and a method for capturing images with a camera having an image sensor. In particular, the method relates to a method for the system, wherein the method is used such that a plurality of images are captured successively by means of the image sensor.

BACKGROUND OF THE INVENTION

Systems, which have a camera with an image sensor for optically capturing a capturing region, are known from the prior art. Systems of this type may also be termed camera systems. The system additionally has a control unit. The control unit is configured to control the camera in such a manner that images are captured successively by means of an image sensor of the camera.

The capturing region which be captured optically by the image sensor only rarely has a constant light intensity and rather often has a temporally changing light intensity. The light intensity in the capturing region may be influenced by external illumination and/or by changing exposure conditions of natural light. Control algorithms are therefore known from the prior art, in order to adapt the exposure time for the image sensor and/or sensor amplification for the image sensor in such a manner that the images of the capturing region optically captured using the image sensor are neither overexposed nor underexposed. Control algorithms are often designed in such a manner that the exposure time and/or sensor amplification may only be adapted in a meaningful manner if the light intensity in the capturing region change slowly and/or steadily.

In the event of a fast change of the light intensity in the capturing region in a time period between the capture of two images by means of the image sensor, it may therefore come to pass that the image of the capturing region captured by the image sensor is underexposed or overexposed. If, for example, the case occurs that the light intensity changes from a medium brightness to a very low brightness at a first time, then known control algorithms are usually designed in such a manner that the exposure time for the image sensor is increased. The change of the exposure time is limited however and may then only be carried out once after the capture of each image. Therefore, a plurality of images and correspondingly a plurality of adaptations of the exposure time for the image sensor are often carried out, with the aim of optically capturing an image of the capturing region, which is not underexposed. The exposure time for the image sensor increases strongly as a result. It is fundamentally possible that such a suitable exposure time is found for the image sensor in order to capture an image of the dark capturing region by means of the image sensor, which is neither overexposed nor underexposed. In practice, however, it has been established that a further case may occur in combination with the previously mentioned case. If the exposure time was initially increased considerably after the previously mentioned first case, a second case may occur thereafter, in which the light intensity in the capturing region is increased rapidly. If the exposure time for the image sensor is still chosen to be very large however, at least during the capture of the first image of the capturing region. A very overexposed image is created as a result. A very overexposed image does not offer any information as such about the value by which the exposure time of the image sensor is to be reduced, in order to capture an image of the capturing region by means of the image sensor, which is neither overexposed nor underexposed. Thus, it may for example be suitable to reduce the exposure time by 10% or by 90%. This information may not be drawn from the previously captured image, however. The known control algorithm therefore reduces the exposure time in small steps. The step by step adaptation of the exposure time only takes place however after the capture of each new image. However, this is very slow, as the exposure time for each image is very high owing to the first case. Thus, if a plurality of images with a very large exposure time in each case are required in order to reduce the exposure time by means of the known control algorithm, a relatively long time period may elapse until an image of the capturing region, which is neither overexposed nor underexposed, may be captured by means of the image sensor.

BRIEF SUMMARY OF THE INVENTION

Aspects of the invention relate to providing a system and a method which enables the capture of images of a capturing region by means of an image sensor of a camera even in the case of heavily changing brightness conditions in the capturing region in such a manner that fast adjustment of the exposure time for the image sensor may be ensured, in order to therefore capture images of the capturing region which are neither overexposed nor underexposed.

According to a first aspect of the invention, a system is provided, which has a camera with an image sensor for optically capturing a capturing region and a control unit for the camera. The control unit is configured to control the camera in such a manner that images are captured successively by means of the image sensor. In addition, the control unit is configured to switch between a first mode and a second mode. Furthermore, the control unit is configured to repeatedly execute the group of steps a) to d) in the first mode. According to step a), determination of an, in particular, average brightness of the last captured image by means of the image sensor as a measured brightness value is provided by means of the control unit. According to step b), determination of a new exposure time target value and/or a new sensor amplification target value based on the last determined measured brightness value is provided by means of the control unit. According to step c), an update of an exposure time for the image sensor by means of the last determined exposure time target value and/or of a sensor amplification of the image sensor by means of the last determined sensor amplification target value is provided by means of the control unit. According to step d), control of the camera by means of the control unit is provided, so that an image is captured by means of the image sensor with the last updated exposure time and/or last updated sensor amplification. The control unit is therefore preferably configured for executing each of the previously mentioned steps a) to d). In addition, the control unit is preferably configured for executing the steps a) to d) successively and in groups. The control unit is additionally configured for detecting a scene change in the capturing region in the first mode. The control unit is configured to switch from the first mode to the second mode when the scene change is detected. In addition, in the second mode, the control unit is configured to update the exposure time for the image sensor by an in particular predetermined exposure time reference value and to control the camera in such a manner that at least one control image is captured using the image sensor and thereafter it is possible to switch back to the first mode.

The system offers the advantage that the control unit of the system may switch from the first mode into the second mode if the scene change in the capturing region is detected by the control unit. This in turn allows the control unit to control the camera differently in the second mode to in the first mode. For example, in the first mode, the control unit may control the camera with the repeated steps a) to d) in steps in such a manner as is known from the prior art. With the switch to the second mode, the control unit may be configured to undertake a different control of the camera, wherein an exposure time reference value is initially used for the exposure time of the image sensor. The exposure time reference value may be predetermined in such a manner that the control unit, in only a few steps, determines an exposure time for the image sensor, using which exposure time an image of the capturing region may be captured, which is neither underexposed nor overexposed. Preferably, the exposure time reference value is predetermined as a particularly small value. An exposure time predetermined by means of the exposure time reference value therefore makes it possible to control the camera by means of the control unit in such a manner that a first control image is captured at least using this exposure time. As the exposure time is small, an adaptation of the exposure time may be undertaken by means of the control unit in only a short time, in order to capture a further control image. This can be continued by the control unit until a control image is captured, which is neither underexposed nor overexposed. Then, the control unit may switch back to the first mode. The control of the camera by means of the control unit in the first mode is therefore possible, as at least one control image may be called upon as a corresponding image for executing the steps a) to d).

The preceding explanations can in particular be used for overcoming the disadvantages mentioned at the beginning. If, for example, a fast change of the light intensity takes place, then it may come to pass that the control unit controls the camera in such a manner in the first mode that initially the exposure time is increased, particularly in a plurality of steps. If a fast increase of the light intensity takes place thereafter in the capturing region, then the detection of a corresponding scene change by means of the control unit offers the possibility that the control unit switches to the second mode. In this case, the exposure time is determined by means of the exposure time reference value, in order to capture at least one control region by means of the image sensor using a corresponding exposure time. As the light intensity in the capturing region is often neither very bright nor very dark after a scene change, it is possible to predetermine an exposure time reference value in such a manner that an image of the capturing region may be captured by means of the image sensor, which is, with a certain probability, neither overexposed nor underexposed. Even if the image is underexposed, the exposure time of the image sensor may be adapted by means of the control unit in a few steps so as to capture an image of the capturing region by means of the image sensor, which is neither overexposed nor underexposed. Preferably, little time elapses between the individual steps, as the exposure time reference value is preferably chosen to be small.

The camera with the image sensor is preferably an imaging camera, particularly an industrial imaging camera. The control unit may be assigned to the camera. Thus, the control unit may be arranged in a housing of the camera. It is however also possible, that the control unit is configured separately from the camera, wherein the control unit in this case is coupled via at least one control line to the camera, in order to control the camera. If the control unit is assigned to the camera, the system may also be formed by the camera. In this case, it may be a camera system.

The control unit may be constructed as an individual control unit. This offers the possibility that the control unit is arranged at a fixed place in the camera. The control unit may however be constructed as a part of a control unit of the camera however. The camera may be constructed to be particularly compact as a result.

The control unit may control the camera. Thus, the control unit may for example control the image sensor and/or other components of the camera, in order to capture images of the capturing region using the image sensor successively by means of the camera.

The control unit may switch between the first mode and the second mode. Here, this is preferably an operating mode of the camera in each case, particularly with regards to control of the camera. The control unit is not however limited to switching between the first mode and the second mode. In particular, at least one further mode for the control unit can also be provided.

The control unit is configured for executing each of the steps a) to d). However, it is provided in the first mode that the steps a), b), c) and d) are executed in the sequence mentioned as a group. This group of steps may be executed repeatedly in groups by the control unit in the first mode. The control unit is configured to this end. The steps a) to d) in the first mode of the control unit may be used to control the camera accordingly, in order to capture an image of the capturing region by means of the image sensor in each associated step d). Prior to the first execution of the group of steps a) to d), the control unit may be configured to control the camera in such a manner that an image is captured by means of the image sensor using an initial exposure time and/or using an initial sensor amplification. The initial exposure time and/or the initial sensor amplification may be predetermined and/or saved by the control unit. The initial exposure time and/or the initial sensor amplification may however also be the exposure time or the sensor amplification which was provided for controlling the camera in the last use.

A sensor signal provided by the image sensor may be transmitted directly or indirectly to the control unit of the camera. The sensor signal may in this case represent the optically captured image of the capturing region. This sensor signal may be analysed by the control unit, in order to determine the brightness, particularly average brightness, of the last image captured by means of the image sensor as measured brightness value of the image. This corresponds to an advantageous embodiment of the step a), which can be executed by the control unit. The brightness of the captured image is preferably the average brightness of all pixels of the image. The corresponding measured brightness value may therefore be an average value. The measured brightness value is used as a basis for determining the exposure time and/or the sensor amplification for the next image to be captured.

The control unit is therefore configured for executing the step b), according to which a new target exposure time value or a new sensor amplification target value is determined based on the previously determined measured brightness value. If, for example, the measured brightness value is larger than a predetermined brightness reference value, the control unit can determine the new exposure time target value in such a manner that the new exposure time target value is smaller than the previously used exposure time for the image sensor. As a result, it is achieved that the new image to be captured has a lower average brightness and thus a smaller measured brightness value. Alternatively or additionally, the control unit can determine the new sensor amplification target value in such a manner that the sensor amplification target value is smaller than the previously used sensor amplification for the image sensor, so that likewise, a smaller average brightness or a smaller measured brightness value is to be expected for the next image to be captured. In addition, the control unit is configured for executing the step c).

According to step c), it may be provided that the exposure time for the image sensor is updated by means of the control unit by the last determined exposure time target value. In this case, the update may be a replacement or determination. Alternatively or additionally, according to step c), it may be provided that the sensor amplification of the image sensor is updated by means of the control unit by the last determined sensor amplification target value. Here, this may be a replacement or determination. By updating the exposure time and/or the sensor amplification, the control unit may control the camera in such a manner that an image is captured by means of the image sensor, wherein the image sensor is exposed with the exposure time or the sensor amplification is applied for the image sensor.

It is therefore provided according to step d), that the control unit controls the camera in such a manner that an image is captured by means of the image sensor with the last updated exposure time and/or the last updated sensor amplification.

If the measured brightness value does not represent an overexposed or underexposed image, it is possible, by means of the measured brightness value, to execute a robust determination for the new exposure time target value or for the new sensor amplification value, which then allows the capture of a further image using the image sensor, wherein the corresponding, updated exposure time and/or updated sensor amplification is applied.

However, if the measured brightness value represents the brightness of an overexposed image, this does at least not robustly allow a conclusion to be drawn about a suitable exposure time and/or a suitable sensor amplification, using which the sensor could capture a further image of the capturing region, which, with a high probability, is neither overexposed nor underexposed.

Therefore, the control unit is configured to switch from the first mode to the second mode when the scene change is detected in the capturing region. The control unit may be configured to detect the scene change in the capturing region based on the sensor signal sent from the image sensor to the control unit. Alternatively or additionally, the control unit may be configured to detect the scene change in the capturing region based on a plurality of past measured brightness values and/or the last-determined measured brightness value. This may for example take place in that the last-determined measured brightness value is considerably larger or considerably smaller than an average value of the remaining measured brightness values to be taken into account. The control unit may however also be configured to detect the scene change in the capturing region in a different way. The switch of the control unit to the second mode preferably takes place after the execution of the group of steps a) to d) in the first mode, for example after step d).

If the control unit has switched to the second mode, the control unit is configured to update the exposure time, preferably in the first step, by means of the, in particular, predetermined exposure time reference value.

An advantageous embodiment of the system is characterized in that the control unit is configured to update the sensor amplification for the image sensor by means of a predetermined sensor amplification reference value in the second mode. In this case, the update may be determination or replacement. At least for the capture of the first control image in the second mode of the control unit, the sensor amplification of the image sensor is therefore preferably the sensor amplification reference value.

A further advantageous embodiment of the system is characterized in that the exposure time reference value is a target value between a predetermined minimum exposure time for the image sensor and 400-times the minimum exposure time. The minimum exposure time for the image sensor is for example the time value for the exposure time of the sensor, which may be provided minimally for the image sensor. Therefore, it may be the smallest possible exposure time for the image sensor. Thus, if the minimum exposure time is provided for the exposure time reference value and this is in turn used in order to capture the first control image by means of the image sensor, then it is possible in the second mode that the capture of the first control image takes place in a very short time. This in turn offers the possibility that a multiplicity of control images may be captured in quick succession, wherein the exposure time for the further control images is increased step by step, particularly until one of the images has an average brightness which ensures and/or indicates a switch of the control unit from the second mode to the first mode. As the minimum exposure time for the image sensor may be very smaller, it is preferably provided that the exposure time reference value is a time value between the minimum exposure time and 400-times the minimum exposure time. The exposure time reference value may therefore be predetermined to a particularly advantageous time value.

A further advantageous embodiment of the system is characterized in that the control unit is configured to read out an image data record from image data of the camera, particularly from the associated image sensor, wherein the read-out image data of the respective image data record represent a captured image or control image. In addition, the control unit is preferably configured to read out the respective image data record from the camera within a readout time, particularly the associated image sensor. In addition, it is preferably provided that the exposure time reference value corresponds to the readout time and/or is determined thereby. In the case of a switch of the control unit to the second mode, the exposure time of the camera is updated by the exposure time reference value. If this is determined by means of the readout time, it may be ensured thereby that the exposure time of the image sensor is updated by the readout time in the event of a switch of the control unit to the second mode. This is true at least for the capture of the first control image. The readout time is also termed read-out time. The readout time is often predetermined. This is because it is possible by means of the design of the image sensor to determine how fast or in which readout time the image data may be read out. As a result, it is possible to ensure both that a further control image is captured as fast as possible and at the same time, it is effectively prevented that a time value is chosen for the exposure time reference value, which is larger than the readout time. However, this is to be avoided, particularly for the capture of the first control image. This is because it is advantageous if the first control image may be captured in shortest possible time and if further control images may be captured thereafter in the shortest possible time. Both can be ensured if the exposure time reference value is determined by the readout time.

An advantageous embodiment of the system is characterized in that the control unit is configured to read out an image data record from image data of the camera, particularly from the associated image sensor, wherein the read-out image data of an image data record represent a captured image or control image, wherein the control unit is configured for reading out the image data record from the camera inside a readout time, particularly the associated image sensor, and wherein the exposure time reference value is a time value between the predetermined minimum exposure time for the image sensor and the readout time. With respect to the minimum exposure time and the readout time, reference is preferably made to the previous explanations. The exposure time reference value can therefore be chosen to be particularly small and nonetheless predetermined in that the exposure time reference value is a time value between the minimum exposure time and the readout time. Reference is analogously made to the corresponding advantages as have been explained in connection with the minimum exposure time and the readout time.

A further advantageous embodiment of the system is characterized in that the control unit is configured to execute the steps e) to h) in the second mode repeatedly in groups after the exposure time is updated by the reference exposure time. According to step d), the control unit for controlling the camera is configured in such a manner that the or a further control image is captured by means of the image sensor with the updated exposure time. According to step f), the control unit is configured for determining an in particular average brightness of the control image last captured by means of the image sensor as measured brightness value. According to step g), the control unit for updating the exposure time by increasing the exposure time is configured in such a manner that the update is executed by the control unit in the event that the last-determined measured brightness value is smaller than a predetermined first brightness limit value. The steps e) to g) may form a group, wherein the control unit is configured to execute this group of steps repeatedly in groups. The step e) is however first executed by the control unit after the control unit has updated the exposure time for the image sensor by means of the exposure time reference value after the switch to the second mode. The control unit is configured to this end. During the first execution of the step e), the camera is controlled by the control unit in such a manner that at least the (first) control image is captured by means of the image sensor with the updated exposure time. If the brightness determined in step f) or the corresponding measured brightness value is smaller than the predetermined first brightness limit value, then the control unit is configured to increase the exposure time. The first brightness limit value may represent a lower limit value. The first brightness limit value may for example be 10% of a maximum brightness which may be captured by the image sensor or a corresponding maximum brightness value. In step g), the exposure time is therefore always increased if the measured brightness value is not greater than the first brightness limit value. This is the case, for example, if the measured brightness value is smaller than 10% of the maximum brightness value. The step g) therefore offers the advantage that the second mode initially ensures an increase of the exposure time before the control unit switches back to the first mode, in which the update of the exposure time can take place at least indirectly based on the last-determined measured brightness value. In addition, the advantage is achieved, that the control unit does not switch to the first mode as long as the control image captured by the image sensor is underexposed or has only a very low exposure. This may be the case, for example, if the measured brightness value is smaller than 10% of the maximum brightness value. The measured brightness value determined in step f) may, upon switch of the control unit from the second mode to the first mode, replace the measured brightness value to be determined according to step a). In other words, the last-executed step f) may replace the step a) after the switch of the control unit from the second mode to the first mode, at least in the case of the first repetition in groups of steps a) to d). The switch of the control unit from the second mode to the first mode may be executed if the condition specified in step g) is no longer fulfilled. The switch of the control unit from the second mode to the first mode may for example be executed if the last-determined measured brightness value is no longer smaller than the predetermined first brightness limit value.

A further advantageous embodiment of the system is characterized in that the control unit is configured to execute the steps e) to h) in the second mode repeatedly in groups. The associated steps e) to g) in this case correspond to the steps e) to g) from the preceding advantageous embodiment of the system. According to the further step h), a switch of the control unit to the second mode is provided in the event that the last-determined measured brightness value is larger than the predetermined first brightness limit value and smaller than a predetermined second brightness limit value, which is larger than the first brightness limit value. The second brightness limit value may for example represent an upper limit value. The second brightness limit value may for example be 90% of the maximum brightness which can be captured by the image sensor or 90% of a maximum brightness value. Thus, the switch of the control unit from the second mode to the first mode may be executed by the control unit if the last-determined measured brightness value is between 10% and 90% of a maximum brightness which can be captured by the image sensor or an associated maximum brightness value. This is because such a last-determined measured brightness value makes it possible to conclude with a certain probability that the last-captured image or control image is neither underexposed nor overexposed. A switch of the control unit to the first mode therefore offers the possibility that the further update of the exposure time takes place at least indirectly on the last-determined measured brightness value. As a result, a particularly advantageous update of the exposure time and/or a corresponding advantageous update of the sensor amplification for the image sensor may be achieved.

An advantageous embodiment of the system is characterized in that the control unit is configured to update the exposure time in step g) in such a manner that the exposure time in the respective step g) is increased by a predetermined iteration value. This offers the advantage that the exposure time may be increased iteratively in each case by the iteration value by means of the repetition in groups of the steps e) to g) or e) to h) in the second mode of the control unit. As a result, the exposure time is therefore increased by the same value in each repetition of the group of steps. In other words, the exposure time may be increased in each step by the same iteration value, which leads to a constant iteration. The iteration value may for example be between a tenth and a twentieth, particularly a sixteenth, of a difference between a predetermined maximum exposure time for the image sensor and the exposure time reference value, particularly the readout time. If the iteration value is a tenth of the previously mentioned difference for example, then in total at most ten repetitions of the steps e) to g) or e) to h) by the control unit are possible, in order to take account of various exposure times for capturing a control image. Thus, the capturing region may be optically captured by means of the image sensor taking account of a limited number of different exposure times, in order to obtain corresponding control images. The probability is high that for one of the control images in step f), a measured brightness value is determined, which lies between the first brightness limit value and the second brightness limit value. Then it is possible for the control unit to switch to the first mode. Furthermore, the control images may also be captured in a limited time. Usually, not all control images are to be captured. Rather, it has been established in practical investigations that for the most part only a few control images or only a few iterative increases of the exposure time are necessary in order to capture a control image in which, in step f), a measured brightness value is determined, which lies between the first and second brightness limit values. Thus, the control unit may be configured to come to an exposure time in a very short time in the second mode, which ensures a switch to the first mode.

An advantageous embodiment of the system is characterized in that the control unit is configured to switch between the first mode, the second mode and a third mode. In particular, the control unit is configured to switch from the second mode to the third mode or vice versa. The control unit is however also configured to switch from the second mode to the first mode or vice versa. Preferably, the control unit is also configured to switch from the third mode to the first mode. In addition, it is provided that the control unit is configured to execute the steps e) to i) repeatedly in groups in the second mode. With respect to the associated steps e) to h), reference is made to the preceding explanations. According to the further step i), it is provided that the control unit is configured to switch to the third mode if the last-determined measured brightness value is larger than the predetermined second brightness limit value. A measured brightness value which is larger than the second brightness limit value indicates that the corresponding control image is overexposed. A switch from the second mode back to the first mode could therefore disadvantageous for the control unit. It is therefore provided that the control unit switches to the third mode if the last-determined measured brightness value is larger than the second brightness limit value.

In addition, it is preferably provided that the control unit is configured in such a manner that the following step j) is executed in the third mode of the control unit. According to step j), it is provided that the control unit updates the exposure time by means of the first average value of the last-updated exposure time and the exposure time updated therebefore. The updates may be understood as a determination and/or replacement. By means of the repetition in groups of steps e) to d) or e) to h) in the second mode, it may be provided that the exposure time is increased during each execution of the step g), in particular is increased by a predetermined iteration value. The last-updated exposure time is therefore larger than the exposure time updated therebefore. The first average value of the two previously mentioned exposure times therefore lies between the last-updated exposure time, which is larger than the second brightness limit value, and the exposure time updated therebefore, which is smaller than the second brightness limit value. The result is that the first average value may basically be smaller than, equal to or larger than the second brightness limit value. There is however the possibility that the first average value is smaller than the second brightness limit value and larger than the first brightness limit value. In this case, the exposure time may be updated using the average value mentioned by way of example, in order to switch from the third mode to the first mode or via the second mode to the first mode. The control unit may therefore basically the configured to switch from the third mode to the first mode.

In addition, the control unit is preferably configured to execute the steps k) to n) repeatedly in groups in the third mode. The steps k) to n) may therefore form a group of steps which are executed repeatedly in groups by the control unit. According to step k), it is provided that the camera is controlled by the control unit in such a manner that a further control image is captured with the last-updated exposure time. According to step l), determination of an, in particular, average brightness of the last captured control image by means of the image sensor as a measured brightness value is provided by means of the control unit. According to step m), an update of the exposure time is provided by means of the control unit by an increase of the exposure time in the event that the last-determined measured brightness value is smaller than the predetermined first brightness limit value or an update of the exposure time is provided by means of the control unit by a reduction of the exposure time in the event that the last-determined measured brightness value is larger than the predetermined second brightness limit value. The first alternative from step m) offers the advantage that the exposure time is increased if the measured brightness value indicates underexposure of the image. The second alternative from step m) offers the advantage that the exposure time may be reduced if the measured brightness value indicates overexposure of the captured control image. If none of the two conditions from the two alternatives from step m) is fulfilled, the exposure time is not updated anew. In this case however, the further step n) may be used. According to the further step n), a switch of the control unit to the first mode is provided in the event that the last-determined measured brightness value is larger than the predetermined first brightness limit value and smaller than the predetermined second brightness limit value. The last-determined measured brightness value may then indicate that the last-captured control image is neither underexposed nor overexposed. The current exposure time may therefore be used as an initial value in order to switch to the first mode of the control unit.

In the third mode of the control unit, interval halving therefore preferably initially takes place between two exposure times, in order to determine a first average value for the exposure time to be determined therefrom. In addition, in the third mode in step m), an increase or a reduction of the exposure time takes place depending on which of the conditions is present. If none of the conditions mentioned in step m) is fulfilled, this may lead in step n) to the control unit switching back to the first mode. Therefore, the increase of the exposure time, as is executed in the second mode of the control unit, is effectively prevented from being interrupted by means of the third mode. Rather, the third mode offers the possibility that the exposure time is also reduced somewhat again, in order to capture a control image with a corresponding exposure time, the measured brightness value of which probably lies between the first and second brightness limit values, in order to switch to the first mode for the control unit thereafter. Then the first mode of the control unit may lead to the repetition in groups of the steps a) to d), which offers an advantageous control of the camera, particularly the associated image sensor, in order to successively capture images with the image sensor, wherein the images are neither overexposed nor underexposed.

A further advantageous embodiment of the system is characterized in that the control unit is configured to update the exposure time in step m) by means of a second average value of the last exposure time and the antepenultimate exposure time in the event that the last-determined measured brightness value is larger than the predetermined second brightness limit value. The last exposure time in this case is the last-updated exposure time. The antepenultimate exposure time in this case is the exposure time updated prior to the penultimate update. The antepenultimate exposure time is smaller than the last exposure time. An average value of these two exposure times, termed the second average value, is therefore used for updating the exposure time. As a result, it is possible that the exposure time updated using the second average value with high probability of capturing an image by means of the image sensor leads to the captured control image being neither overexposed nor underexposed.

A further advantageous embodiment of the system is characterized in that the control unit is configured to update the exposure time in step m) by means of a third average value of the last exposure time and the penultimate exposure time in the event that the last-determined measured brightness value is smaller than the predetermined first brightness limit value. The last exposure time is preferably understood to mean the last-updated exposure time. The penultimate exposure time is preferably the exposure time updated therebefore. A control image was captured using the last-updated exposure time and the last exposure time respectively, which image gives rise to the last-determined brightness value, which is smaller than the first brightness limit value. This means that the control image is underexposed. The formation of the third average value from the last exposure time and the penultimate exposure time therefore offers the possibility that this third average value may update the exposure time for the capture of the next control image in such a manner that this control image is neither overexposed nor underexposed.

A further advantageous embodiment of the system is characterized in that the control unit is configured to determine the exposure time target value and/or the sensor amplification target value in such a manner that a product value is in a predetermined target range, particularly between 0.1 and 0.9, or a predetermined value, particularly 0.5, wherein the product value is the product of the exposure time target value and the sensor amplification target value standardized to a predetermined product maximum value. Taking the predetermined target range into account for determining the exposure time target value or the sensor amplification target value may contribute to the reduction of the computing outlay. The alternative determination of the exposure time target value with the value 0.5 has often proven a suitable starting point in practice. The same may advantageously apply for the sensor amplification target value. The maximum product value may for example be the mathematical product of the predetermined maximum exposure time value and the predetermined maximum sensor amplification value. Both previously mentioned values may be determined for the camera or the image sensor. Thus, the maximum product value may also be predetermined. The standardized product of the exposure time target value and the sensor amplification target value may be a mathematical product in this case. The product value may therefore be determined according to the following formula:

$$\text{product value} = \frac{\left(\begin{array}{c}\text{exposure time target value} \times \\ \text{sensor amplification target value}\end{array}\right)}{\text{maximum product value}}$$

In this case, the product value is to be determined in such a manner by means of the suitable determination of the exposure time target value and the sensor amplification target value that the product value is in the predetermined target range, particularly between 0.1 and 0.9. If, for example, the sensor amplification target value is already predetermined, a range for the exposure time target value may be determined therefrom. If the target range is determined by a fixed value, particularly 0.5, then a determined value for the exposure time target value may also accordingly be determined. The predetermined target range is preferably chosen in such a manner that, at least when considered statistically, there is a particularly high chance in the same that the control unit may control the camera in the first mode, in order to capture images, which are neither overexposed nor underexposed.

A further advantageous embodiment of the system is characterized in that the control unit is configured to detect the scene change in the capturing region based on the last-captured measured brightness value and a maximum brightness value saved by the control unit, if the last-captured measured brightness value is at least 90% of the maximum brightness value. The scene change in the capturing region may for example be characterized by a rapid change from dark lighting conditions to bright lighting conditions in the capturing region. In this case, the scene change may take place so quickly that the control unit in the first mode only undertakes the determination of the new exposure time target value and/or the new sensor amplification target value in such a delayed and/or limited manner that the image capture by means of the image sensor with the correspondingly updated exposure time and/or the correspondingly updated sensor amplification leads to an overexposed image or nearly overexposed image. An image of this type therefore leads to a measured brightness value which may be at least 90% of the maximum brightness value. The correspondingly high measured brightness value therefore points indirectly to the scene change in the capturing region. This information and/or this context is therefore used in order to detect the scene change in the capturing region by means of the control unit. Thus, if the last-captured measured brightness value is at least 90% of the maximum brightness value, the control unit is preferably configured to detect a scene change in the capturing region based on the corresponding measured brightness value. If, by contrast, the captured measured brightness value is smaller than 90% of the maximum brightness value, for example 60% of the maximum brightness value, then this indicates that the brightness in the capturing region has only changed slightly. This is not significant for a scene change in the capturing region however.

A further advantageous embodiment of the system is characterized in that the control unit is configured to detect the scene change in the capturing region based on the last-captured measured brightness value and a maximum brightness value saved by the control unit, if the last-captured measured brightness value is at most 10% of the maximum brightness value. The maximum brightness value is preferably the value which represents the maximum brightness in the capturing region which can be captured by the image sensor of the camera. A scene change in the capturing region may also or alternatively be characterised by a rapid change from bright to dark in the capturing region. Analogously to the previously explained embodiment of the system, this may lead to the control unit determining an exposure time target value and/or a sensor amplification value, wherein capturing an image by means of the image sensor with the correspondingly updated exposure time and/or the correspondingly updated sensor amplification leads to an image which corresponds to a measured brightness value which is smaller than 10% of the maximum brightness value. Such a low measured brightness value for the most part only occurs if a very rapid change of the light intensity in the capturing region takes place, so that the control unit is not designed to adapt the exposure time and/or the sensor amplification in such a manner that neither an underexposed nor an overexposed image is created. An image which gives rise to a measured brightness value which is smaller than 10% of the maximum brightness value may therefore indicate a scene change. Therefore, the control unit may be configured to detect the scene change in the capturing region based on the last-captured measured brightness value if this is at most 10% of the maximum brightness value.

A further advantageous embodiment of the system is characterized in that the control unit is configured to detect the scene change in the capturing region based on the last-captured measured brightness value and a measured brightness value captured temporally before that. Particularly if a quotient of the two mentioned brightness values is particularly small or particularly large and/or if a difference in amount between the two brightness values is large, this may indicate that the brightness in the capturing region was changed very rapidly, which is significant for a scene change in the capturing region. The detection of a large difference in amount between the brightness values mentioned may therefore be detected and used by the control unit in order to detect the scene change in the capturing region.

A further advantageous embodiment of the system is characterized in that the control unit is configured to detect the scene change in the capturing region based on a histogram of the last-captured image. Thus, the control unit may for example be configured to determine the distribution of the brightness values and to detect a scene change in the capturing region if the histogram of the last-captured image represents a very dark image, particularly an underexposed image, or a very bright image, particularly an overexposed image. The histogram such may in this case represent the statistical accumulation of the grey values or the colour values of the image.

An advantageous embodiment of the system is characterized in that each image captured by the camera is subdivided into a multiplicity of pixels, wherein the control unit is configured to determine a first pixel count of pixels, the brightness value of which is in each case smaller than a first brightness limit value saved by the control unit, and wherein the control unit is configured to detect the scene change based on the first pixel count. The first brightness limit value can be predetermined in such a manner that a pixel with a lower brightness value than the first brightness limit value is considered to be a saturated or a black-saturated pixel. The first brightness limit value can for example be 10% of the maximum brightness value. A corresponding pixel therefore only represents the colour black and/or only a very low light. In the case of a high number of such pixels, it is therefore to be assumed that the image created therefrom is underexposed. The number of such pixels may therefore indicate an underexposed image, which in turn indicates a scene change in the capturing region. Therefore, the control unit is preferably configured to detect the scene change in the capturing region based on the first pixel count. In particular, the control unit may be configured to detect the scene change in the capturing region if the first pixel count is larger than a predetermined value and/or if the proportion of the first pixel count in the total number of pixels of the respectively captured image is larger than a predetermined, in particular further value. If the proportion is for example larger than 60%, 70% or 80%, then this may be an indicator for the scene change in the capturing region.

A further advantageous embodiment of the system is characterized in that each image captured by the camera is subdivided into a multiplicity of pixels, wherein the control unit is configured to determine a second pixel count of pixels, the brightness value of which is in each case larger than a second brightness limit value saved by the control unit, and wherein the control unit is configured to detect the scene change based on the second pixel count. The second brightness limit value is preferably 90% of the maximum brightness value. The second brightness limit value may therefore be determined in such a manner that a pixel with a larger brightness value than the second brightness limit value is considered to be an unsaturated and/or a white-unsaturated pixel. If the second pixel count is particularly large, this may indicate an overexposed image, which in turn indicates a scene change in the capturing region. In particular, the control unit may be configured to detect the scene change in the capturing region if the second pixel count is larger than a predetermined value and/or if the proportion of the second pixel count in the total number of pixels of the respectively captured image is larger than a predetermined (further) value. Reference is preferably made in an analogous manner to corresponding explanations as have been explained in connection with the preceding advantageous embodiment.

According to a second aspect of the invention, a method is provided, which has the following steps:

V1) capturing an image by means of an image sensor, which is configured for optical capture of a capturing region and forms a part of the camera, which is controlled by a control unit, wherein the control unit is configured to switch between a first mode and a second mode;

V2) transferring the control unit to the first mode, in which the steps a) to d) of the method are executed repeatedly in groups by the control unit:

determining an, in particular, average brightness of the image last captured by means of the image sensor as a measured brightness value, determining a new exposure time target value and/or a new sensor amplification target value based on the last-determined measured brightness value, updating an exposure time for the image sensor by means of the last determined exposure time target value and/or of a sensor amplification of the image sensor by means of the last determined sensor amplification target value, and controlling the camera, so that an image is captured by means of the image sensor with the last updated exposure time and/or last updated sensor amplification, V3) checking at least the last-captured image by means of the control unit, if the control unit is in the first mode, for detecting a scene change in the capturing region, V4) transferring the control unit from the first mode to the second mode, if the scene change is detected, wherein the exposure time for the image sensor is updated in the second mode of the control unit by means of a predetermined exposure time reference value;

V5) controlling the camera by means of the control unit in the second mode, so that at least one control image is captured by means of the image sensor with the last-updated exposure time; and V6) transferring the control unit from the second mode to the first mode after completion of step V5).

Each of the steps of the method, particularly each of the steps V1), V2), V3), V4), V5) and V6), may have associated partial steps. Preferably, step V1) is executed before step V2), particularly before a first-time execution of the step V2). The partial steps of step V2), particularly the partial steps a), b), c) and d), may form a group of partial steps of the step V2), wherein the group of partial steps inside of step V2) may be executed repeatedly in groups. Step V3) may be executed in parallel to step V2), temporally offset and thus partially in parallel to step V2) or subsequent to step V2). Step V4) is executed after step V3). Step V5) may be executed after step V4). Step V6) is executed after step V5).

The method steps of the method according to the second aspect of the invention correspond to the method steps which may be executed by the control unit of the system according to the first aspect. For the method, and in particular for the associated method steps, reference is therefore made at least in an analogous manner to the advantageous explanations, preferred features, effects and/or advantages, as have been described in connection with the system according to the first aspect of the invention. An analogous repetition is therefore dispensed with.

Advantageous aspects of the method are described in the following. The method features of each of advantageous embodiment of the method correspond to corresponding system features, particularly an associated configuration of the control unit, of an advantageous embodiment of the system. For each advantageous embodiment of the method, and in particular the associated method steps, reference is therefore made at least in an analogous manner to the advantageous explanations, preferred features, effects and/or advantages, as have been described in connection with the corresponding advantageous embodiment of the system. Here also, a repetition is therefore dispensed with.

An advantageous aspect of the method is characterized in that the sensor amplification for the image sensor is updated in step V4) by means of a predetermined sensor amplification reference value.

An advantageous aspect of the method is characterized in that the exposure time reference value is a target value between a predetermined minimum exposure time for the image sensor and 400-times the minimum exposure time.

An advantageous aspect of the method is characterized in that after each capture of an image or control image, an image data record from image data from the camera is read out by means of the control unit, wherein the read-out image data of an image data record represent a captured image or control image, wherein the control unit is configured to read out the image data record from the camera within a readout time, and wherein the exposure time reference value corresponds to the readout time.

An advantageous aspect of the method is characterized in that after each capture of an image or control image, an image data record from image data from the camera is read out by means of the control unit, wherein the read-out image data of an image data record represent a captured image or control image, wherein the control unit is configured to read out the image data record from the camera within a readout time, and wherein the exposure time reference value is a time value between a predetermined minimum exposure time for the image sensor and the readout time.

An advantageous aspect of the method is characterized in that the steps e) to g) are executed repeatedly in groups by the control unit as partial steps of the step V5) of the method:

controlling the camera so that the or a further control image is captured by means of the image sensor with the last-updated exposure time;

determining an, in particular, average, brightness of the control image last captured by means of the image sensor as a measured brightness value; and updating the exposure time by increasing the exposure time in case that the last-determined measured brightness value is smaller than a predetermined first brightness limit value.

The partial steps of step V5), particularly the partial steps e), f) and g), may form a group of partial steps of the step V5), wherein the group of partial steps inside of step V5) may be executed repeatedly in groups.

An advantageous aspect of the method is characterized in that the steps e) to h) are executed repeatedly in groups by the control unit as partial steps of the step V5) of the method:

switching to the first mode for the control unit in case that the last-determined measured brightness value is larger than the predetermined first brightness limit value and smaller than a predetermined second brightness limit value, which is larger than the first brightness limit value.

The partial steps e) to g) were already described in the preceding advantageous embodiment of the method and may therefore be a part of the last-mentioned embodiment of the method. If the switch to the first mode is executed according to step h), this step h) may replace the step V6).

An advantageous aspect of the method is characterized in that the exposure time is updated in step g) in such a manner that the exposure time is increased by a predetermined iteration value.

An advantageous aspect of the method is characterized in that the steps e) to i) are executed repeatedly in groups by the control unit as partial steps of the step V5) of the method:

switching to a third mode for the control unit in case that the last-determined measured brightness value is larger than the predetermined second brightness limit value, wherein the following step j) of the method is executed subsequently by means of the control unit:

updating the exposure time by means of a first average value of the last-updated exposure time and the exposure time updated therebefore by means of the control unit in the third mode;

wherein, subsequently to step j), the steps k) to n) of the method are executed repeatedly in groups by the control unit in the third mode:

controlling the camera so that a further control image is captured by means of the image sensor with the updated exposure time;

determining an, in particular, average brightness of the control image last captured by means of the image sensor as a measured brightness value;

updating the exposure time by an increase of the exposure time in case that the last-determined measured brightness value is smaller than the predetermined first brightness limit value or updating the exposure time by a reduction of the exposure time in case that the last-determined measured brightness value is larger than the predetermined second brightness limit value; and switching to the first mode for the control unit in case that the last-determined measured brightness value is larger than the predetermined first brightness limit value and smaller than the predetermined second brightness limit value.

The partial steps e) to g) and step h) were already described in one of the preceding advantageous aspects of the method in each case and may therefore be a part of the last-mentioned aspect of the method. Preferably, step j) is only executed if the switch according to step i) is also actually executed. The steps k) to n) may be a further group of partial steps of the step V5), wherein this further group of partial steps within step V5) may be executed repeatedly in groups.

An advantageous aspect of the method is characterized in that the exposure time is updated in step m) by means of a second average value of the last exposure time and the antepenultimate exposure time in case that the last-determined measured brightness value is larger than the predetermined second brightness limit value.

An advantageous aspect of the method is characterized in that the exposure time is updated in step m) by means of a third average value of the last exposure time and the penultimate exposure time in case that the last-determined measured brightness value is smaller than the predetermined first brightness limit value.

An advantageous aspect of the method is characterized in that the exposure time target value and/or the sensor amplification target value is determined in such a manner by means of the control unit that a product value is in a predetermined target range, particularly 0.1 and 0.9, or a predetermined value, particularly 0.5, wherein the product value is the product of the exposure time target value and the sensor amplification target value standardized to a predetermined product maximum value.

An advantageous aspect of the method is characterized in that the scene change in the capturing region is detected in step V3) by means of the control unit based on the last captured measured brightness value and a maximum brightness value saved by the control unit, if the last captured measured brightness value is at least 90% of the maximum brightness value.

An advantageous aspect of the method is characterized in that the scene change in the capturing region is detected in step V3) by means of the control unit based on the last captured measured brightness value and a maximum brightness value saved by the control unit, if the last-captured measured brightness value is at most 10% of the maximum brightness value.

An advantageous aspect of the method is characterized in that the detection of the scene change in the capturing region is executed in step V3) by means of the control unit based on the last captured measured brightness value and a measured brightness value detected temporally before that.

An advantageous aspect of the method is characterized in that the detection of the scene change in the capturing region is executed in step V3) by means of the control unit based on a histogram of the last captured image.

An advantageous aspect of the method is characterized in that each image captured by the camera is subdivided into a multiplicity of pixels, wherein the first pixel count of pixels, the brightness value of which is in each case smaller than a first brightness limit value saved by the control unit, is determined by means of the control unit, and wherein the detection of the scene change in step V3) is executed by means of the control unit based on the first pixel count of the black-saturated pixels.

An advantageous aspect of the method is characterized in that each image captured by the camera is subdivided into a multiplicity of pixels, wherein a second pixel count of pixels, the brightness value of which is in each case larger than a second brightness limit value saved by the control unit, is determined by means of the control unit, and wherein the detection of the scene change in step V3) is executed by means of the control unit based on the pixel count of the white-unsaturated pixels.

BRIEF DESCRIPTION OF THE DRAWINGS

Further features, advantages and application possibilities of the present invention result from the following description of the exemplary embodiments and the figures. All described and/or pictorially illustrated features form the subject matter of the invention per se and in any desired combination, even independently of their summarization in the individual claims or back references thereof. In the figures, the same reference numbers furthermore stand for the same or similar objects.

DETAILED DESCRIPTION

Figure 1:
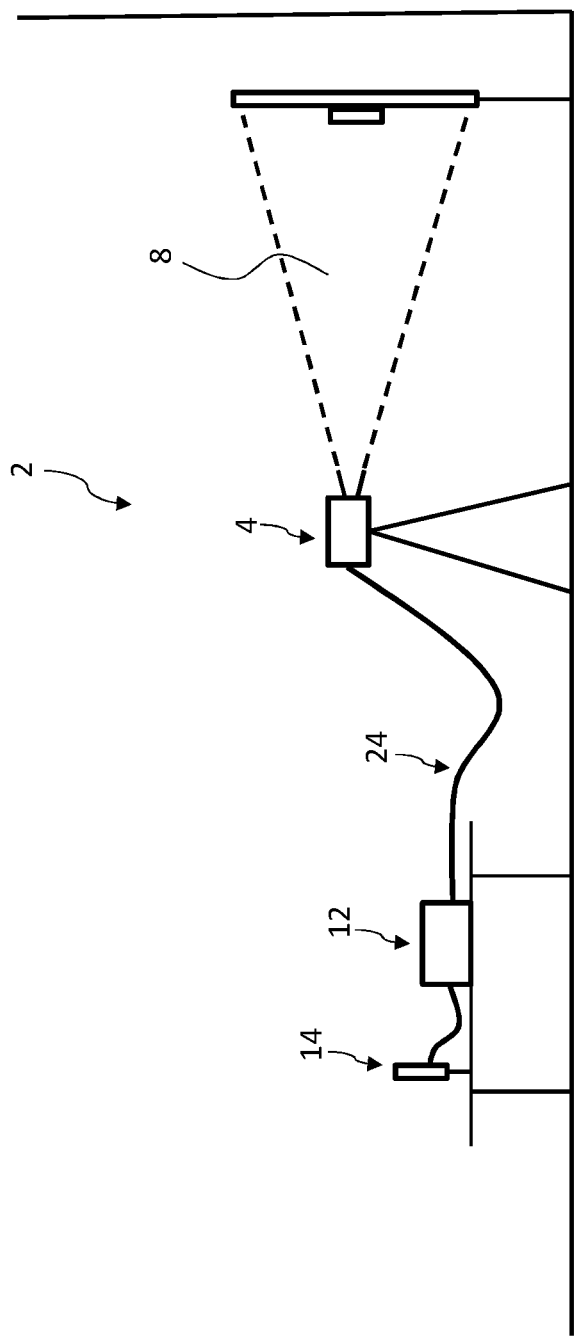
FIG. 1 shows an advantageous embodiment of a system in a schematic illustration.
Figure 2:
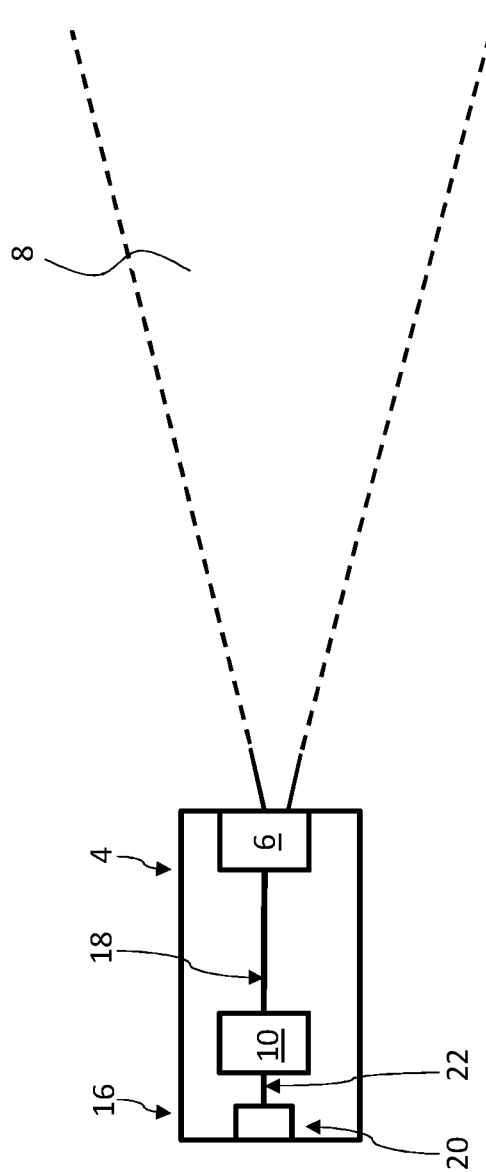
FIG. 2 shows a further advantageous embodiment of a camera in a schematic illustration.

An advantageous embodiment of the system 2 with a camera 4 is illustrated in FIG. 1. The camera 4 has an image sensor 6. To this end, reference is made by way of example to FIG. 2, in which the camera 4 is illustrated by way of example.

The image sensor 6 of the camera 4 is configured for optically detecting a capturing region 8. The capturing region 8 is preferably a region assigned to the image sensor 6, which directly adjoins the image sensor 6. The capturing region 8 may therefore be the predetermined region, which may be optically captured by the image sensor 6.

The system 2 additionally has a control unit 10. As can be drawn by way of example from FIG. 2, it may be provided that they control unit 10 is assigned to the camera 4. Thus, the camera 4 may for example have a housing 16, wherein the control unit 10 and the image sensor 6 are arranged in the housing 16 in each case. The control unit 10 may be coupled to the image sensor 6 via a signal connecting line 18. It is also fundamentally possible that the control unit 10 and the image sensor 6 form a unit of consolidated and/or integrated construction.

The camera 4 may additionally have an interface 20. The interface 20 may be coupled to the control unit 10 via a further signal line 22. The control unit 10 forms a control unit for the camera 4. The control unit 10 may be configured for controlling the camera 4, and the associated subunits in particular. The control unit 10 is configured to control the camera 4 in such a manner that images may be captured successively by means of the image sensor 6. The control unit 10 may read out an image data record made up of image data from the image sensor 6 of the camera 4 via the signal line 18, wherein the read-out image data of a respective image data record represent a correspondingly captured image of the capturing region 8. The image data record may be transmitted via a corresponding signal from the image sensor 6 via the signal line 18 to the control unit 10. In addition, the control unit 10 may be configured to transmit a further image signal via the further signal line 22 to the interface 20, in order to make a corresponding image signal available, which represents at least one optically captured image of the capturing region 8.

As can be drawn by way of example from FIG. 1, the camera 4 may be coupled to a data processing unit 12 via a further signal line 24. If the control unit 10 does not form a constituent of the camera 4, the control unit 10 may be formed by the data processing unit 12. The preceding explanations may therefore apply analogously for the control unit 10 if the same is formed by the data processing unit 12, as the control unit 10 is coupled to the camera 4 via the further signal line 24, in order to control the camera 4. In this case, the system 2 may also comprise the data processing unit 12 and the signal line 24.

Furthermore, a display unit 14 is illustrated purely by way of example in FIG. 1, which display unit is coupled via a further signal line 26 to the data processing unit 12. The data processing unit 12 may be constructed and/or configured in order to transmit an image signal via the signal line 26 to the display unit 14, which image signal represents an image which is created by the data processing unit 12 based on the image signal which is transmitted by means of the further signal line 24 to the data processing unit 12.

The control unit 10 of the system 2 is configured to control the camera 4 in such a manner that images are captured successively by means of the image sensor 6. The control unit 10 may also be configured to control the camera 4 in such a manner that a multiplicity of images are captured successively by means of the image sensor 6.

It is known fundamentally that the optical capture of the capturing region 8 by means of the image sensor 6 depends on an exposure time of the image sensor 6 and a sensor amplification of the image sensor 6. For each image to be captured, the exposure time of the image sensor 6 and the sensor amplification of the image sensor 6 may therefore be sacked by means of the control unit 10. The exposure time of the image sensor 6 is also termed the exposure time in the following. The sensor amplification of the image sensor 6 is also termed the sensor amplification in the following.

Figure 3:
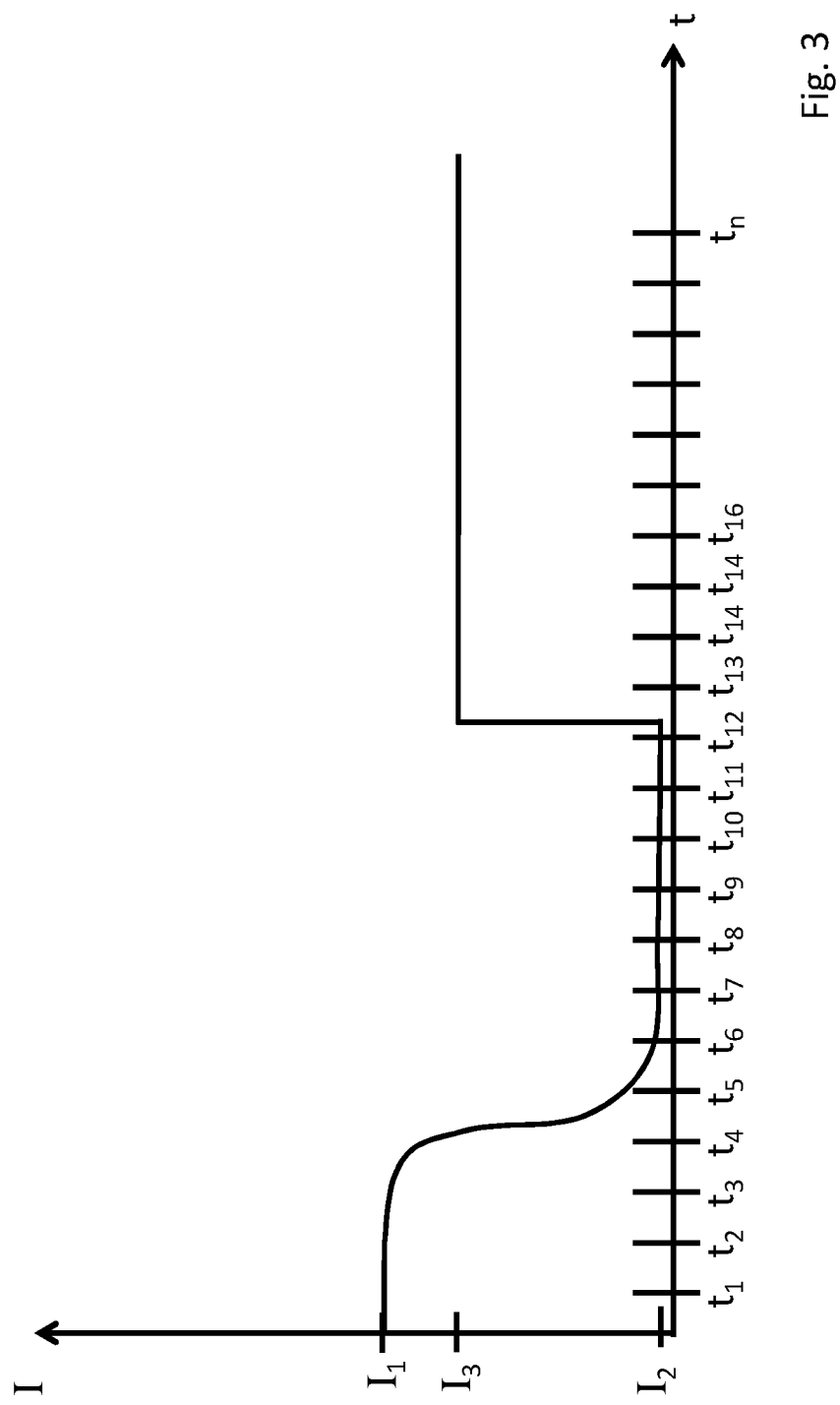
FIG. 3 shows an exemplary temporal course of a light intensity in a capturing region.

An exemplary temporal course of the light intensity I in the capturing region 8 is illustrated schematically in FIG. 3. At a time $t_1$, the light intensity I in the capturing region 8 is a first light intensity $I_1$. This light intensity $I_1$ also remains substantially unchanged at each of the following times $t_2$ and $t_3$. An adaptation of the exposure time and/or the sensor amplification is not therefore necessary in order to capture an image of the capturing region 8 by means of the image sensor 6, which is neither overexposed nor underexposed. However, at the time $t_4$, the light intensity I in the capturing region 8 has already changed. Therefore, it is necessary for example to increase the exposure time in order to continue to not capture an underexposed image of the capturing region 8 by means of the image sensor 6. At the further times $t_5$, $t_6$, $t_7$ and $t_8$, a further adaptation of the exposure time of the image sensor 6 in particular is necessary in each case, in order to be able to follow the changing light intensity I in the capturing region 8, in order to capture an image of the capturing region 8 by means of the image sensor 6, which is neither underexposed nor overexposed. Between the time intervals $t_{12}$ and $t_{13}$ however, a very rapid and large change of the light intensity I in the capturing region 8 takes place, specifically from the light intensity $I_2$ to the light intensity $I_3$. In practice, it has been established that such a jump in the light intensity I cannot be followed by means of the usual adaptation of the exposure time and/or the sensor amplification. This usually leads to an overexposed image of the capturing region 8 being captured by means of the image sensor 6 at the exemplary time $t_{13}$. This overexposure is for the most part so pronounced that no suitable information can be drawn from the captured overexposed image about how strong this overexposure is and/or by which value the sensor amplification and/or the exposure time are to be changed in order to capture a non-overexposed image of the capturing region 8 by means of the image sensor 6.

The course of the light intensity I in the capturing region 8 takes place for example in the case of a scene change in the capturing region 8. The scene change occurs for example in the case of a very marked change in the light intensity I within a very short time in the capturing region 8. The scene change may therefore be characterised by a particularly large light-intensity gradient, as may be the case for example between the times $t_{12}$ and $t_{13}$ for the case shown in FIG. 3.

Figure 4:
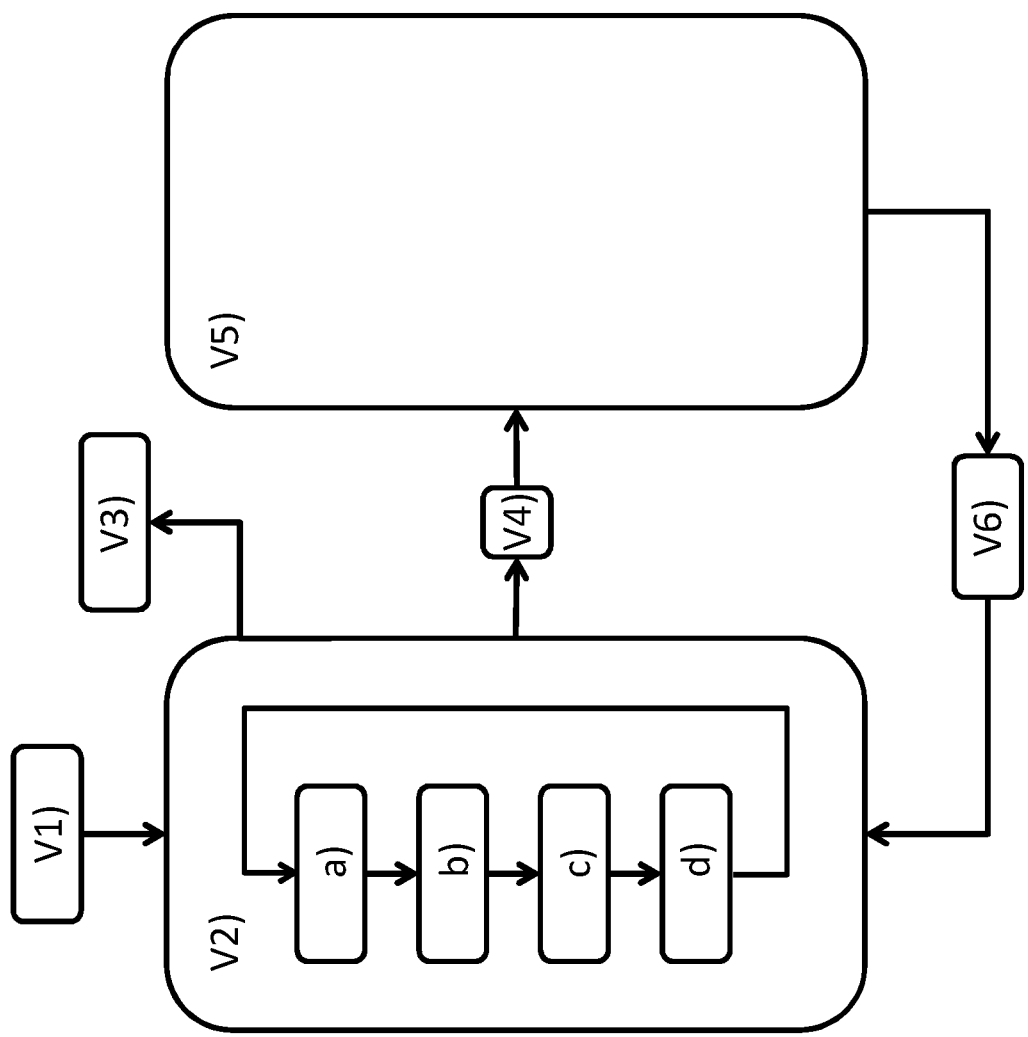
FIG. 4 shows a flow chart of the method in a schematic view, according to an aspect of the invention.

To overcome the previously mentioned problem, a method with the steps V1) to V6) is provided, wherein a corresponding flow chart for executing the steps V1) to V6) emerges by way of example from FIG. 4. Even if advantageous explanations, preferred features, effects and/or features of the method are described in the following, it is preferably provided that corresponding advantageous explanations, preferred features, effects and/or advantages may apply analogously for the system 2, particularly for the associated control unit 10.

The method comprises the steps V1), V2), V3), V4), V5) and V6).

According to step V1), capture of an image is provided by means of the image sensor 6, which is configured for the optical capture of the capturing region 8 and forms part of the camera 4, which is controlled by the control unit 10, wherein the control unit 10 is configured to switch between a first mode and a second mode. A mode of the control unit 10 may also the determined and/or designed as an operating mode or as a type of operation. Certain method steps and/or certain partial steps of a method step may therefore only be executed in one of the possible modes of the control unit 10 for example. Thus, it is provided for example that the method step V2) is only executed in the first mode. This may also apply for the associated partial steps a)-d) of the step V2) of the method. The control unit 10 may be configured to switch between the first mode and the second mode as a function of certain requirements.

According to step V2) of the method, it is provided to transfer the control unit 10 to the first mode, wherein in the first mode of the control unit 10, the partial steps a) to d) of the method are executed repeatedly in groups by the control unit 10. The partial steps a) to d) may therefore form a group of partial steps. This group of partial steps a) to d) may be executed repeatedly in groups by the control unit 10 in the first mode of the control unit 10. This can also be seen schematically from FIG. 4. After the steps a), b), c) and d) have been executed one after the other, there is a restart with step a), in order to execute the previously mentioned sequence of partial steps a) to d).

Preferably, the control unit 10 is in the first mode when the light intensity I in the capturing region 8 only changes temporally slowly. This is because it is preferably provided that the partial steps a) to d) of the method step V2) enable an adaptation of the exposure time and/or the sensor amplification of the image sensor 6 in such a manner that an image of the capturing region 8 captured by means of the image sensor 6 is neither overexposed nor underexposed.

According to the partial step a) of the method step V2), determination of an, in particular, average brightness of the last captured image by means of the image sensor 6 as a measured brightness value is provided. This last captured image may for example be captured during the first execution of the method in step V1), preferably by means of the image sensor 6 using a predetermined exposure time and/or a predetermined sensor amplification. If the group of partial steps a) to d) is executed repeatedly in groups, then in step a), reference can also be made to the last image captured in the preceding step d). The image brightness may be different as a function of the exposure time and/or the sensor amplification. The image brightness is determined in step a) by means of the control unit 10. Here, this may be the average brightness of the image. The brightness is determined as the measured brightness value. The measured brightness value determined in step a) can also be termed the last-determined measured brightness value. The measured brightness value may give information about whether the last-captured image, to which the last-captured measured brightness value corresponds, is too bright or too dark. The exposure time and/or the sensor amplification may be changed accordingly.

According to step b) of the method step V2), determination of a new exposure time target value and/or a new sensor amplification target value based on the last determined measured brightness value is therefore provided. The last-determined measured brightness value can be compared with a predetermined brightness reference value. If the last-determined measured brightness value is larger than the brightness reference value, then the new exposure time target value can be determined to be smaller than the last-used exposure time for the image sensor. Conversely, it may also be provided that the sensor amplification target value is determined to be smaller than the last-used sensor amplification for the image sensor 6. The control unit 10 may be configured to determine the correspondingly new exposure time target value and/or the correspondingly new sensor amplification target value in step b) based on the last-determined measured brightness value. Here, as explained previously, a predetermined brightness reference value can be taken into account.

If the actual light intensity I in the capturing region 8 has not changed during the step a), the exposure time target value for the exposure time or the sensor amplification target value for the sensor amplification offers a good starting point in order to capture a particularly well exposed image of the capturing region 8. According to step c) of the method step V2), an update of the exposure time for the image sensor 6 is therefore provided by means of the last-determined exposure time target value and/or an update of the sensor amplification of the image sensor 6 is therefore provided by means of the last-determined sensor amplification target value. Thus, the exposure time can be determined or replaced by means of the last-determined exposure time target value. Alternatively or additionally, the sensor amplification of the image sensor 6 can be determined and/or replaced by means of the last-determined sensor amplification target value.

According to partial step d) of the method step V2), control of the camera 4 by means of the control unit 10 is provided, so that an image is captured by means of the image sensor 6 with the last updated exposure time and/or last updated sensor amplification. If the actual light intensity I in the capturing region 8 has not changed during the steps a) to c), then the image captured by the image sensor 6 will very probably have a particularly good average brightness. However, even if the light intensity I in the capturing region 8 has changed a little, there continue to be good chances that the image captured by means of the image sensor 6 has an acceptable average brightness.

If, by contrast, an abrupt change of the light intensity I in the capturing region 8 takes place for example, before the image is captured by means of the image sensor 6 in step d), then the image will very probably be either overexposed or underexposed. However, this is to be avoided.

According to step V3) of the method, a check at least of the last-captured image is therefore provided by means of the control unit 10 for detecting a scene change in the capturing region 8. In this case, step V3) is executed if the control unit 10 is in the first mode. The check is at least executed on the image captured last in step d) of the method step V2). As the partial steps a) to d) in step V2) are executed repeatedly in groups, step V3) can also be executed each time when an image has been captured in step d) by means of the image sensor 6. Each of these images can therefore be checked by means of the control unit 10 according to step V3). Therefore, step V3) can be executed at least partially in parallel to step V2). Thus, step V3) can for example be executed directly after step d) and prior to step a) of the next group repetition. The control unit 10 may be configured to detect the scene change in the capturing region 8 based on the check result from step V3). Step V3) can therefore also comprise the detection of the scene change in the capturing region 8 by means of the control unit 10 based on the check result of the check of the at least last-captured image. The control unit 10 may be configured for this.

If the scene change in the capturing region 8 is detected in step V3), it makes sense to end or interrupt the execution of the step V2) or the repetition in groups of the partial steps a) to d) of the step V2). According to step V4), transferring the control unit 10 from the first mode to the second mode is therefore provided, if the scene change is detected in the capturing region 8, particularly in step V3), wherein the exposure time for the image sensor 6 is updated in the second mode of the control unit 10 by means of a predetermined exposure time reference value. The exposure time may therefore be determined and/or replaced by means of the exposure time reference value.

Figure 5:
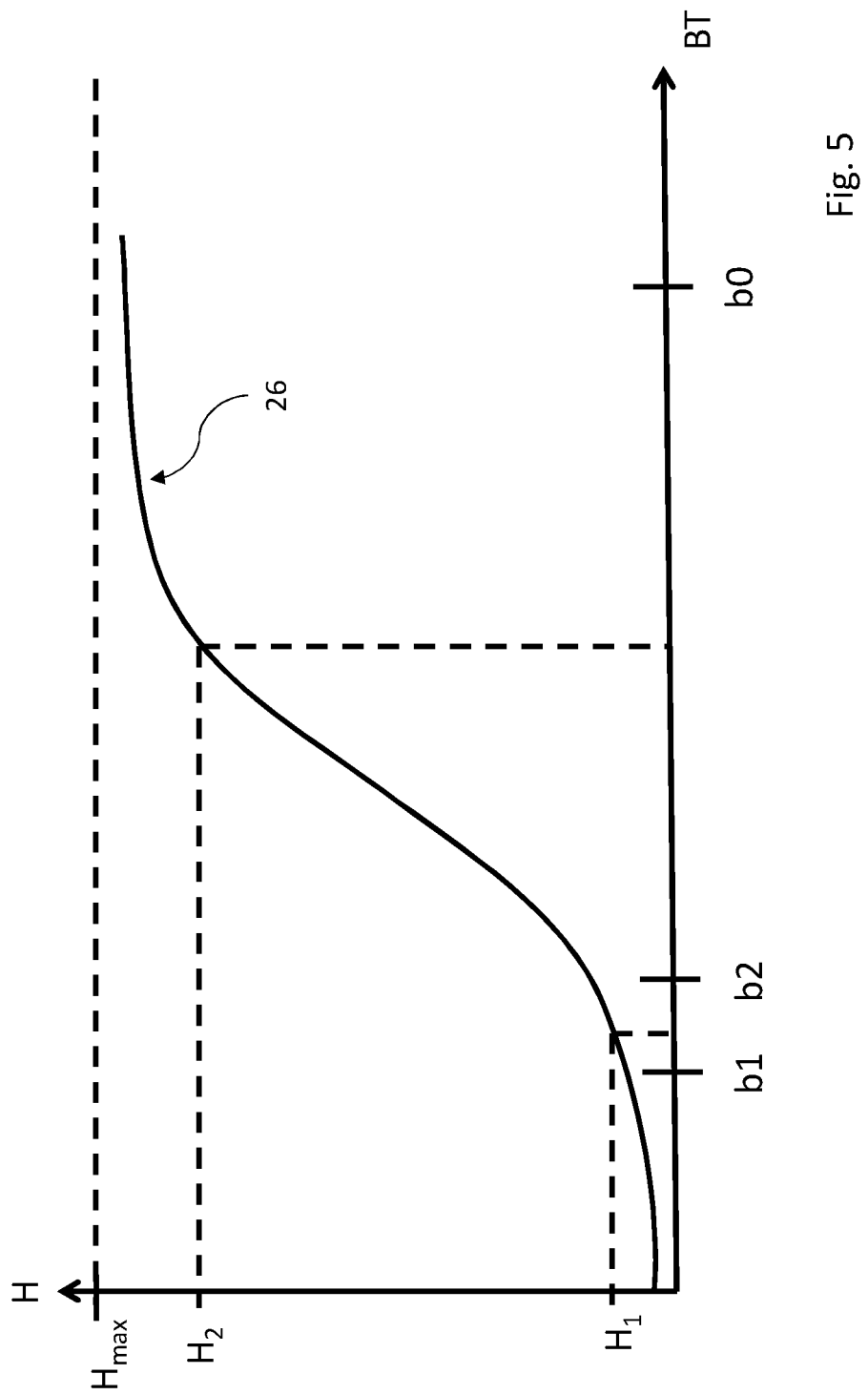
FIG. 5 shows an advantageous embodiment of a characteristic curve of a brightness of an image as a function of the exposure time for the image sensor.

Purely by way of example, reference should be made in the following to the illustration from FIG. 5. A characteristic curve of a characteristic line 26 is illustrated in FIG. 5, which illustrates the brightness H of an image as a function of the exposure time BT of the image sensor 6. For the case that an abrupt change of the light intensity I has taken place in the capturing region 8, as is illustrated for example in FIG. 3 between the times $t_{12}$ and $t_{13}$, or that a scene change has taken place in the capturing region 8, it may come to pass that the image captured last or thereafter is overexposed. This may for example be traceable back to the fact that the exposure time b0 for the image sensor 6 used for that was chosen to be very large. The resultant brightness H of the image captured by the image sensor 6 may then for example almost be the maximum brightness $H_{max}$, which does not allow any conclusions about how a suitable value for the brightness BT of the image sensor 6 is to be chosen, in order to capture an image of the capturing region 8 by means of the image sensor 6, which is neither overexposed nor underexposed. The continuation of the repetition in groups of the partial steps a) to d) from step V2) may therefore be disadvantageous, as the exposure time target value newly determined in step b) in each case is often only slightly smaller than the last-used exposure time b0. Both the exposure time b0 and the further exposure time are very large in each case, so that the execution of a group of the partial steps a) to d) take up a relatively large amount of time. If the scene change in the capturing region 8 is therefore detected in step V3), it is provided according to step V4) that the exposure time BT is updated by means of the predetermined exposure time reference value b1. The predetermined exposure time reference value b1 is preferably chosen to be small or very small. This allows a very rapid capture of an image of the capturing region 8 by means of the image sensor 6. This image is also termed a control image.

According to step V5), a control of the camera 4 by means of the control unit 10 in the second mode is therefore provided in such a manner that at least one control image of the capturing region 8 is captured by means of the image sensor 6 using the last-updated exposure time. The exposure time when taking the first control image is preferably the predetermined exposure reference time b1. Should the brightness H of the first captured control image be underexposed, then the exposure time may be increased by a predetermined value, so that the exposure time b2 is chosen for the capture of the second control image of the capturing region 8. The capture of the second control image may take place in a short time after the capture of the first control image, as the predetermined exposure reference time is preferably chosen to be small. Therefore, the exposure time b2 for the second control image may also be slightly larger and thus furthermore small as a whole. If the brightness of one of the control images is within a predetermined brightness range, it may be provided that the control unit 10 switches from the second mode back to the first mode.

According to step V6) of the method, a transfer of the control unit 10 from the second mode to the first mode is therefore provided after completion of the step V5). If the control unit 10 is back in the first mode, the step V2) may therefore be executed again. In addition, the step V3) may be executed again in the first mode of the control unit 10.

The switch of the control unit 10 from the first mode to the second mode if a scene change has been detected in the capturing region 8 offers the advantage that within a short time, at least one, but preferably a plurality of control images of the capturing region 8 may be captured by means of the image sensor 6. As emerges by way of example from FIG. 5, it may for example be provided that two control images are captured if the control unit 10 is in the second mode. The exposure time b2 of the image sensor 6 may then lead, in the case of a corresponding use with the image sensor 6, to the capture of a control image of the capturing region 8, the brightness H of which is larger than a predetermined first brightness limit value $H_1$ and smaller than a predetermined second brightness limit value $H_2$. The two brightness limit values $H_1$ and $H_2$ may be chosen such that they offer possible limits for the use of the control unit 10 in the first mode, in which at least according to experience, images may be captured, which are neither overexposed nor underexposed. Thus, if the control unit 10 switches back to the step V2) a short time after the execution of the step V5) through step V6), then images of the capturing region 8 may be captured by means of the repetition of the partial steps a) to d) of the step V2), which images are neither overexposed nor underexposed. Therefore, the average brightness captured in the respective step a) may also be used as measured brightness value in order to determine a new exposure time target value and/or a new sensor amplification value in step b), which is used for updating the exposure time or the sensor amplification of the image sensor 6 in partial step c). Thereupon, the camera 4 may be controlled in such a manner by the control unit 10 in the respective partial step d), that an image is captured by means of the image sensor 6 using the last-updated exposure time and/or the last-updated sensor amplification, which image has, with high probability, a very good average brightness, particularly with only a small difference from a desirable predetermined brightness reference value. The switch of the control unit 10 from the first mode to the second mode and back to the first mode therefore furthermore offer the advantage that suitable values for the exposure time and/or the sensor amplification are found particularly rapidly, which offer a suitable starting point when switching the control unit 10 back to the first mode, in order to again execute the precise control of the camera 4 for capturing images of the capturing region 8.

It has been established to be advantageous if the sensor amplification for the image sensor 6 is updated in step V4) using the control unit 10 by means of a predetermined sensor amplification reference value. The sensor amplification may therefore be determined and/or replaced by the sensor amplification reference value. In an analogous manner to the update of the exposure time by means of the exposure time reference value, the update of the sensor amplification by means of the sensor amplification reference value may offer the possibility that in step V5), the first control image or one of the further control images has a brightness H, which allows a switch of the control unit 10 from the second mode to the first mode.

As already explained previously by way of example, it is preferably provided that the exposure time reference value is chosen to be as small as possible, so that at least the first control image may be captured particularly rapidly. It is therefore preferably provided that the exposure time reference value b1 is a target value between a predetermined minimum exposure time for the image sensor 6 and 400-times the minimum exposure time. The minimum exposure time is preferably the smallest exposure time which may be set for the image sensor 6. According to practical experiments, for example, it may be a thousandth of a second and/or determined by the image sensor 6. Other particularly small values, for example between a ten-thousandth and a hundredth of a second are therefore possible time values for the minimum exposure time.

After capturing an image or control image, an image data record made up of image data from the camera 4, particularly from the associated image sensor 6, is read out by means of the control unit 10. The respectively read-out image data of an image data record may in this case represent the respectively last-captured image or control image. The image data cannot however be read out arbitrarily rapidly. Rather, the control unit 10 may be configured to read out the image data record, which corresponds to the last-captured image or control image, from the camera 4 or from the associated image sensor 6 itself within a readout time. The readout time may therefore be limited and/or determined by constructive and/or structural parameters of the image sensor 6, the camera 4 and/or the control unit 10. Thus, it is for example possible that the control unit 10 is configured to read out an image data record from the image sensor 6 or from the camera 4 within a readout time of a tenth of a second. In practical investigations, it has been established to be advantageous if the exposure time reference value for example corresponds to the readout time or is determined thereby. It may also be provided however that the exposure time reference value is a time value between the previously explained, predetermined minimum exposure time for the image sensor 6 and the readout time. Both previously mentioned embodiments were in practice determined as an advantageous starting point for the exposure time reference value, which makes it possible to only have to capture one control image or only a few control images in step V5), in order thereupon to allow the control unit 10 to switch from the second mode to the first mode in step V6).

Figure 6:
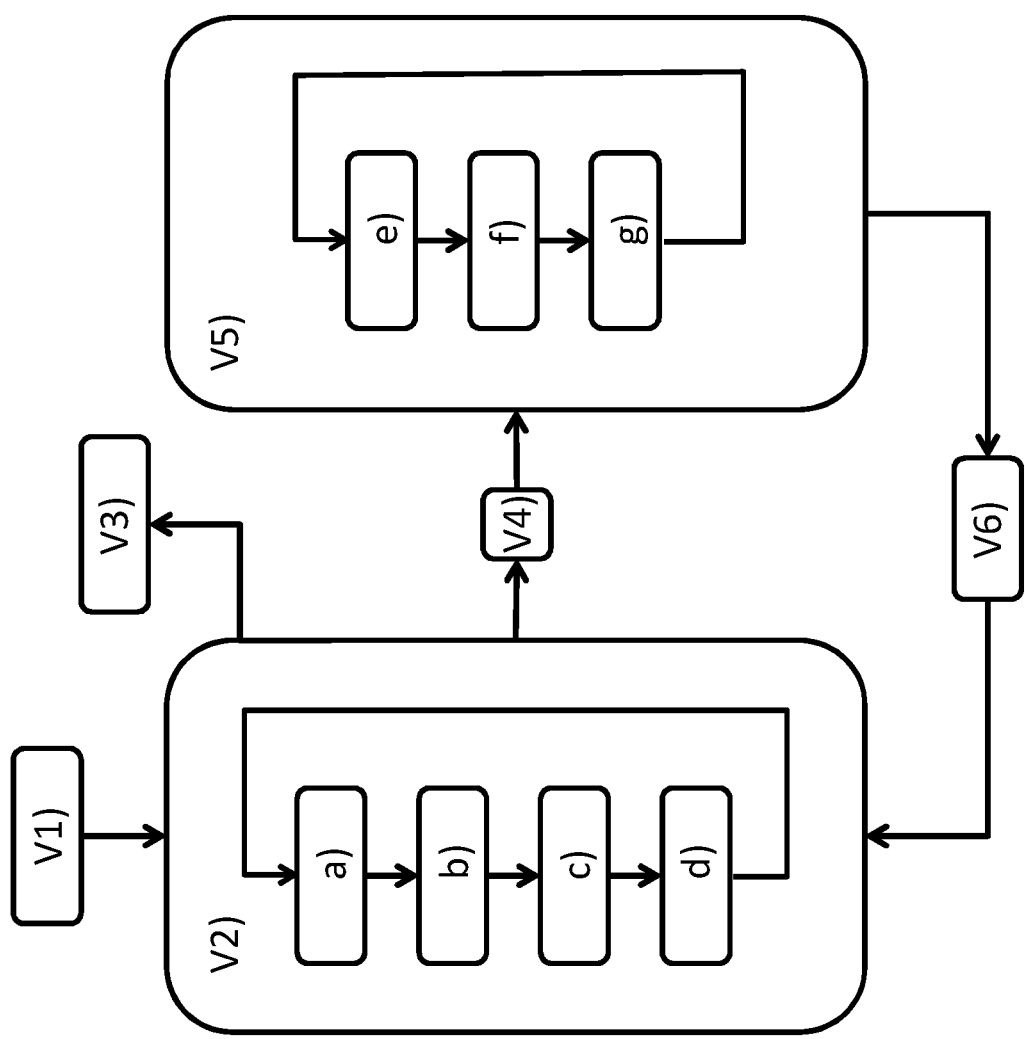
FIG. 6 shows another flow chart of the method in a schematic view, according to an aspect of the invention.

An advantageous aspect of the method is illustrated in a schematic flow chart in FIG. 6. In this case, this aspect of the method differs by means of the step V5). This is because the previously explained step V5) may be replaced and/or specified by the step V5), illustrated by way of example in FIG. 6, with the partial steps e) to g), which can be executed repeatedly in groups by the control unit 10. The step V5) furthermore provides that the control unit 10 is in the second mode and in this case executes the group of steps e), f) and g) repeatedly in groups in the specified sequence. According to step e) of step V5), a control of the camera 4 by means of the control unit 10 in the second mode is provided in such a manner that the or a further control image is captured by means of the image sensor 6 using the last-updated exposure time. Step V5) is executed after step V4). In step V4), the exposure time is updated by means of the predetermined exposure time reference value. When partial step e) is executed the first time in step V5), the last-updated exposure time is therefore determined by means of the predetermined exposure time reference value. During the first execution of step e), the camera 4 is therefore controlled in such a manner by the control unit 10, that a control image is captured with the last-updated exposure time, namely the predetermined exposure time reference value. This captured control image may also be termed the first control image. According to the subsequent step f), determination of an, in particular, average brightness of the last captured control image by means of the image sensor 6 as a measured brightness value takes place by means of the control unit 10. This measured brightness value may also be termed the last-determined measured brightness value. The average brightness of the control image in this case is in particular the average brightness of the preferred multiplicity of pixels of the control image. According to step g), an update of the exposure time by means of the control unit 10 is provided by means of an increase of the exposure time, in the event that the last-determined measured brightness value is smaller than the predetermined, first brightness limit value $H_1$.

By way of example, reference should be made anew to FIG. 5. If, during the first execution of the partial step e) in step V5), the camera 4 is controlled by the control unit 10 in such a manner that a control image is captured by means of the image sensor 6 with an exposure time which corresponds to the predetermined exposure time reference value, then an average brightness may be determined as the measured brightness value for this image in step f), which is smaller than the predetermined first brightness limit value $H_1$. In this case, in step g), the exposure time may be increased, for example to the value b2. If the group of the partial steps e) to g) is executed anew according to an advantageous embodiment of the step V5), then the camera 4 may be controlled by the control unit 10 in such a manner that a further control image is captured by means of the image sensor 6 with the exposure time b2. In the following step f), an average brightness of this further control image may then be determined, wherein this average brightness, which is then determined as measured brightness value, is larger than the predetermined first measured brightness value $H_1$.

As already explained previously by way of example, a control image with an average brightness between the predetermined first brightness limit value $H_1$ and the predetermined second brightness limit value $H_2$ are used as a suitable starting point in order to transfer the control unit 10 back to the first mode.

It has therefore been established to be advantageous if the group of the partial steps of the step V5) of the method has a further partial step h). The group of the partial steps e), f), g), h) may then form the group of partial steps of the step V5) of the method, which are executed repeatedly in groups by the control unit 10 according to step V5). According to the further step h), a switch of the control unit 10 to the first mode is provided if the last-determined measured brightness value is larger than the predetermined first brightness limit value $H_1$ and smaller than the predetermined second brightness limit value $H_2$. The second brightness limit value $H_2$ is in this case larger than the first brightness limit value $H_1$. Preferably, the first brightness limit value $H_1$ is 10% of the maximum brightness $H_{max}$. In addition, it is preferably provided that the second brightness limit value $H_2$ is 90% of the maximum brightness $H_{max}$. If the last-determined measured brightness value is larger than the first brightness limit value $H_1$, no update of the exposure time is executed by the control unit 10 in step g). However, if the last-determined measured brightness value is not only larger than the first brightness limit value $H_1$, but rather at the same time also smaller than the second brightness limit value $H_2$, then the control unit 10 is configured to switch from the second mode to the first mode in step h). If partial step h) of the step V5) of the method is actually executed, partial step h) may replace step V6) of the method and/or execute step V6) simultaneously thereto. Step h) may therefore form a specification of step V6).

Figure 7:
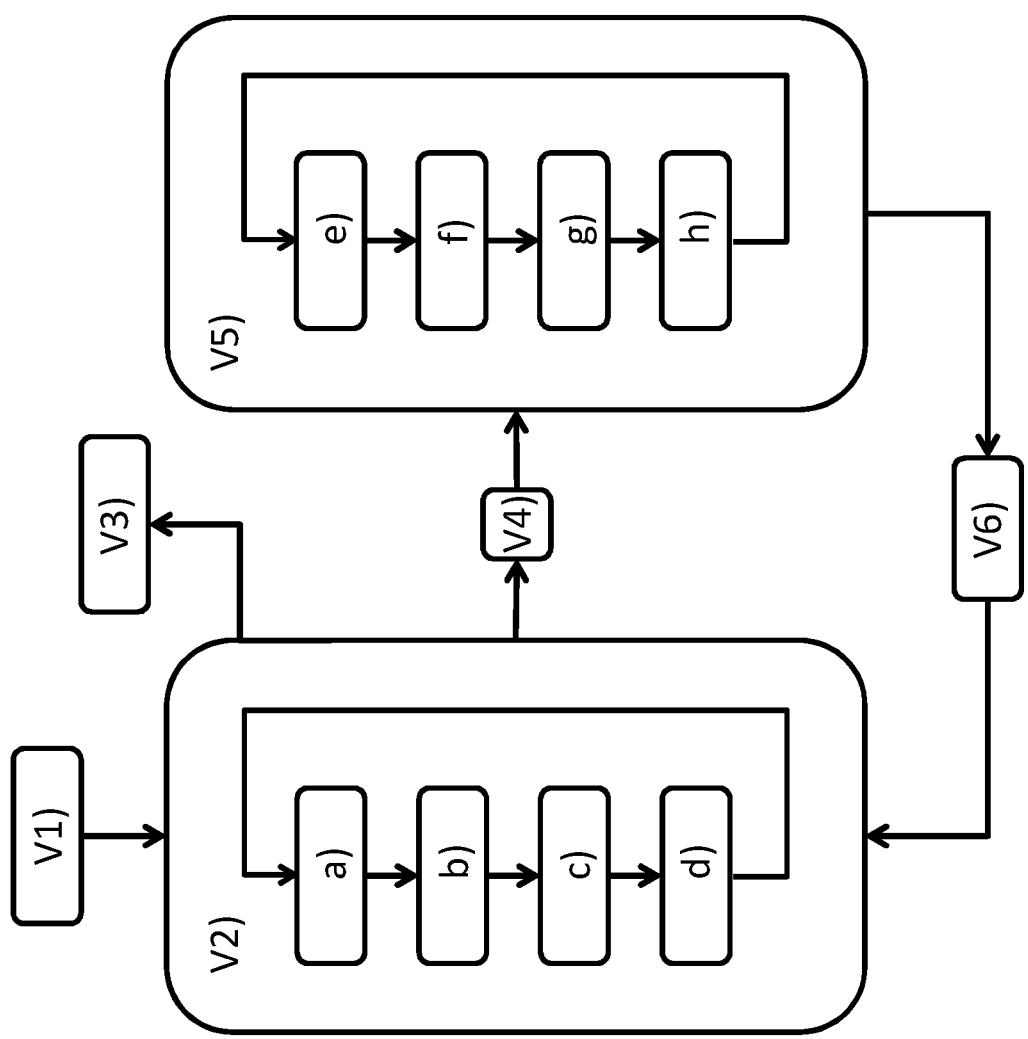
FIG. 7 shows yet another flow chart of the method in a schematic view, according to an aspect of the invention.

An advantageous aspect of the method is illustrated in a schematic flow chart in FIG. 7, wherein the step V5) has the group of partial steps e), f), g) and h). In addition, it can be drawn schematically from FIG. 7 that this group of partial steps e) to h) are executed repeatedly in groups in step V5).

Figure 8:
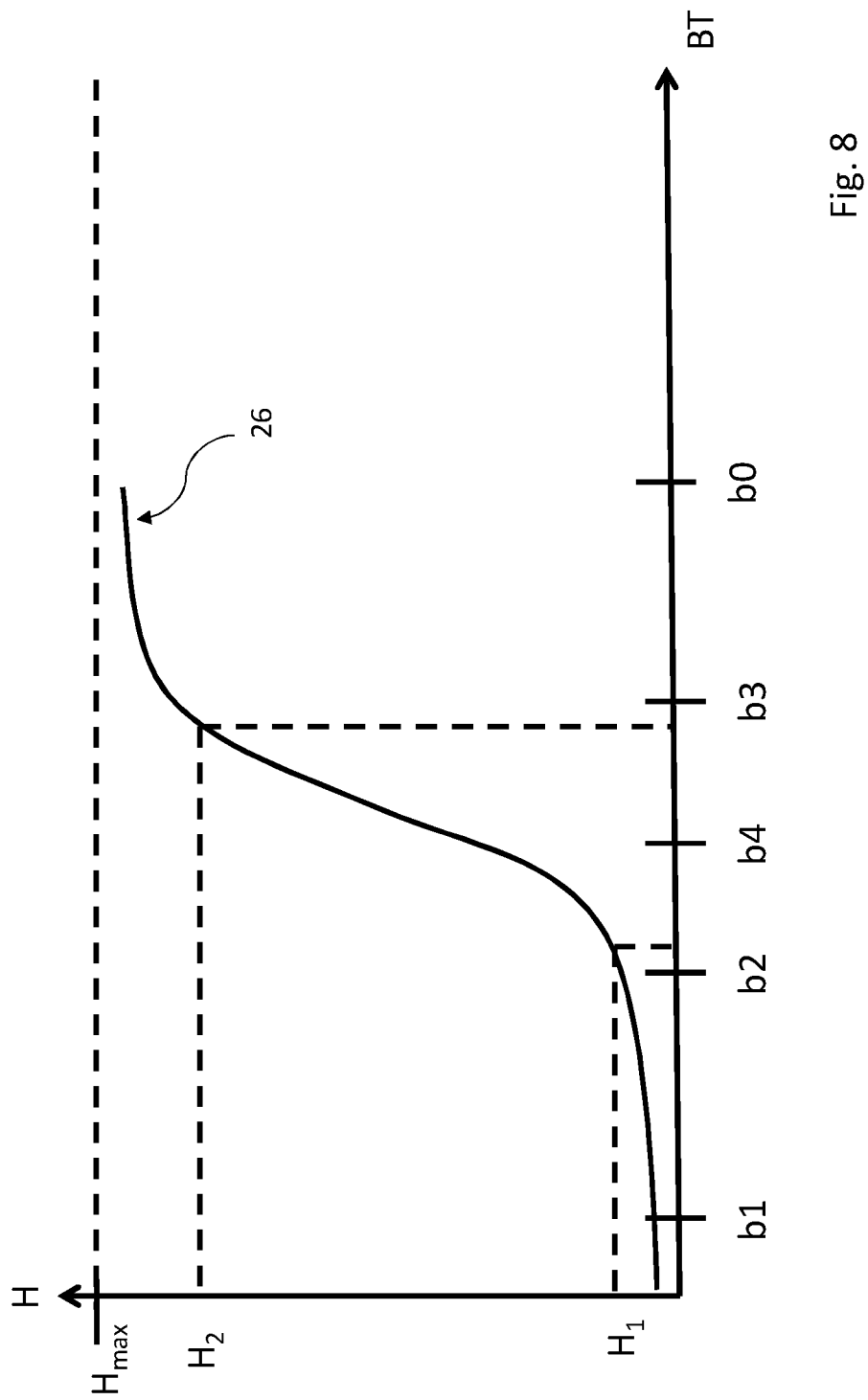
FIG. 8 shows a further advantageous embodiment of a characteristic curve of a brightness of an image as a function of the exposure time for the image sensor.

A further advantageous embodiment of a characteristic line 26 is illustrated in FIG. 8, which represents the relationship between the brightness and the exposure time of the image sensor 6. In the case of an exposure time b0, a scene change in the recording space 8 is detected in step V3) by the control unit 10 at least based on the last-captured image. According to the steps V4) and the previously mentioned advantageous embodiment of the step V), a control image is therefore initially captured by means of the image sensor 6 with the exposure time b1, which leads to a control image with an exposure time which is smaller than the first brightness limit value $H_1$. This leads to an update of the exposure time by an increase of the exposure time. A switch, according to step h), to the first mode does not take place. Thereupon, during the repetition of the steps e) to h) in step V5), a further control image is initially captured by means of the image sensor 6 with the exposure time b2, wherein, however, this control image has an average brightness, which is furthermore smaller than the first brightness limit value $H_1$. Thus, a renewed increase of the exposure time takes place in step g). A switch of the control unit 10 to the first mode does not take place however. According to step V5), the group of steps e) to h) is therefore carried out anew. In this case, the camera 4 is controlled by means of the control unit 10 in such a manner that a further control image is captured by means of the image sensor 6 last-updated exposure time b3. This constitutes an example of how the exposure time may be increased in partial step g) by a predetermined iteration value in each case. As the control image, which is captured by means of the image sensor 6 with the exposure time b3, has an average brightness which is larger than the second brightness limit value $H_2$, it can be seen that the increase of the exposure time by a fixed iteration value in step g) does not necessarily lead to the desired result. It may therefore also be provided that the exposure time is updated in such a manner in step g) that the exposure time is increased after each executed step g) by an increase value belonging to the same. This increase value may conversely be proportional to the number of the repetition of the execution of the step g). It may result from this for example that the exposure time is determined in the mentioned step g) not by the exposure time b3, but rather by the exposure time b4. In this case, the control image then has an average brightness which is larger than the first brightness limit value $H_1$ and smaller than the second brightness limit value $H_2$. According to step h), this then leads to the switch of the control unit 10 to the first mode.

However, even if the exposure time is increased by a predetermined iteration value in each step g), it is nonetheless possible that an exposure time is found with the control unit 10 in the second mode by means of the method, which exposure time allows a switch of the control unit 10 to the first mode.

Figure 9:
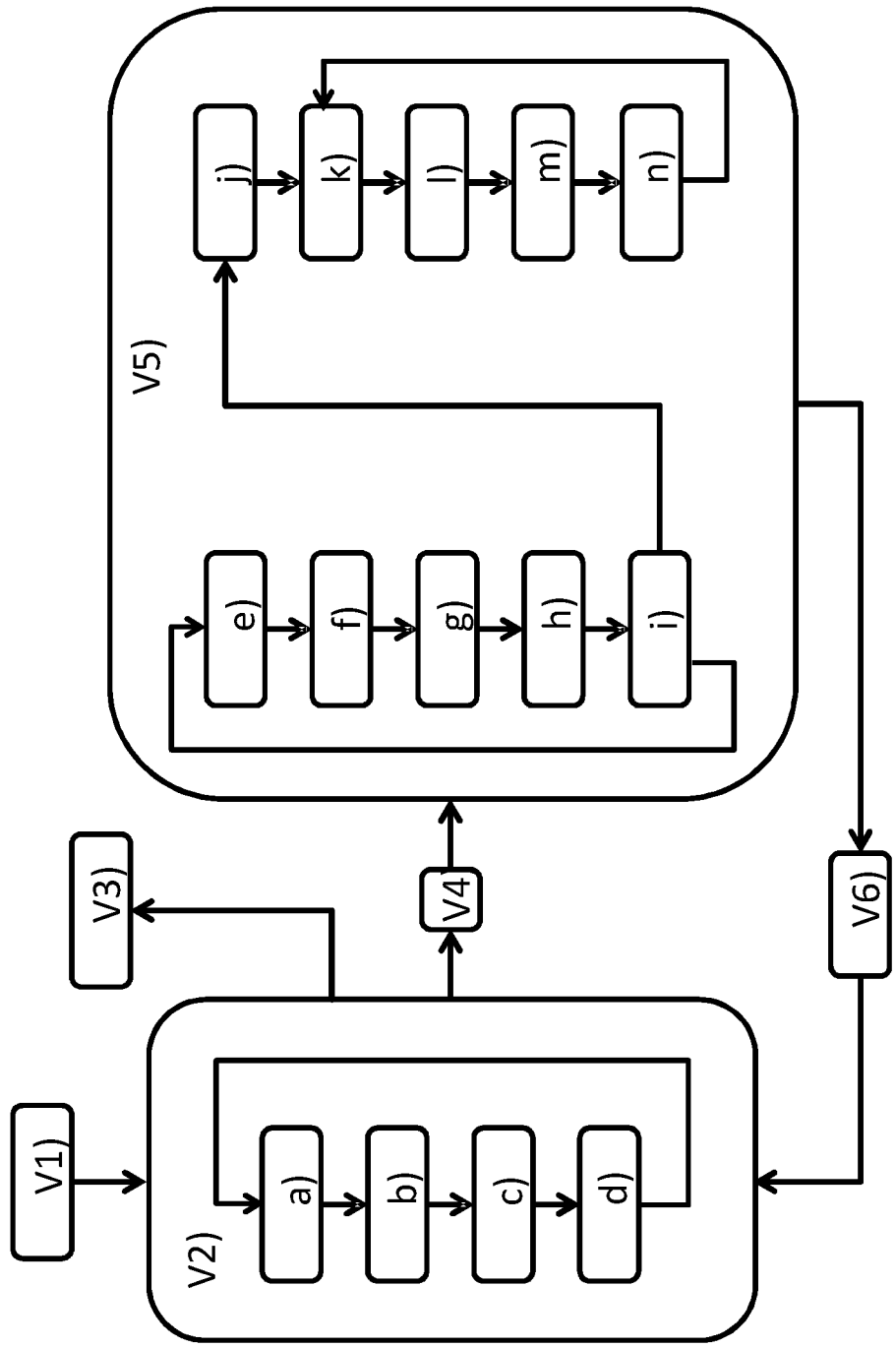
FIG. 9 shows another flow chart of the method in a schematic view, according to an aspect of the invention.

A further advantageous aspect of the method is illustrated in a schematic flow chart in FIG. 9. In this cases, the step V5) comprises the steps e) to n). The partial steps e) to i) in this case form a group of partial steps, wherein it is possible according to the step V5) in particular that the group of the partial steps e) to i) are executed repeatedly in groups by the control unit 10. In this case, the steps e) to h) correspond to the previously explained steps e) to h). According to the further step i), a switch of the control unit 10 to the third mode is provided if the last-determined measured brightness value is larger than the predetermined second brightness limit value $H_2$. This has already been explained by way of example on the basis of FIG. 8, specifically in the example in which the exposure time b3 for the image sensor 6 was used for capturing the control image. If the switch of the control unit 10 to the third mode takes place, the partial step j) of the method step V5) of the method is executed subsequently to step i) by means of the control unit. In other words, subsequent to step i), the partial step j) is only executed if the last-determined measured brightness value is larger than the predetermined second brightness limit value $H_2$.

The control unit 10 is configured to only execute the step j) in the third mode of the control unit 10. According to step j), an update of the exposure time by means of the control unit 10 is provided by means of a first average value of the last-updated exposure time b3 and the exposure time b2 updated therebefore. The exposure time is therefore averaged to the average value of the two exposure times b3 and b2, so that the exposure time is b4. Subsequent to partial step j), it is provided according to step V5) of the method that the partial steps k) to n) are executed as a further group of the step V5) repeatedly in groups by the control unit 10 in the third mode. According to partial step k), a control of the camera 4 by means of the control unit 10 is provided in such a manner that a further control image is captured by means of the image sensor 6 using the last-updated exposure time. In this context, reference is made anew to FIG. 8. The last-updated exposure time b4 was formed from an average value of the exposure times b3 and b2. A control image, which is captured by means of the image sensor 6 with the exposure time b4, may therefore have an average brightness which is larger than the first brightness limit value $H_1$ and smaller than the second brightness limit value $H_2$. According to step l), determination of an, in particular, average brightness of the last captured control image by means of the image sensor 6 as a measured brightness value is therefore provided. In addition, according to step m), an update of the exposure time is provided by means of the control unit 10 by an increase of the exposure time in the event that the last-determined measured brightness value is smaller than the predetermined first brightness limit value $H_1$ or by a reduction of the exposure time by means of the control unit 10 in the event that the last-determined measured brightness value is larger than the predetermined second brightness limit value $H_2$. Both of the last-mentioned conditions do not exist in the case described by way of example in FIG. 8. The update of the exposure time according to step m) is therefore not carried out. According to the step n) of the method step V5), a switch of the control unit 10 to the first mode is provided if the last-determined measured brightness value is larger than the predetermined first brightness limit value $H_1$ and smaller than the predetermined second brightness limit value $H_2$. In the example illustrated in FIG. 8, this is the case. Therefore, a control image, which was captured by means of the sensor 6 with the exposure time b4, may lead to the control unit 10 switching from the third mode to the first mode. Step n) can therefore replace the step V6) during the actual execution and/or at least indirectly form the same.

Figure 10:
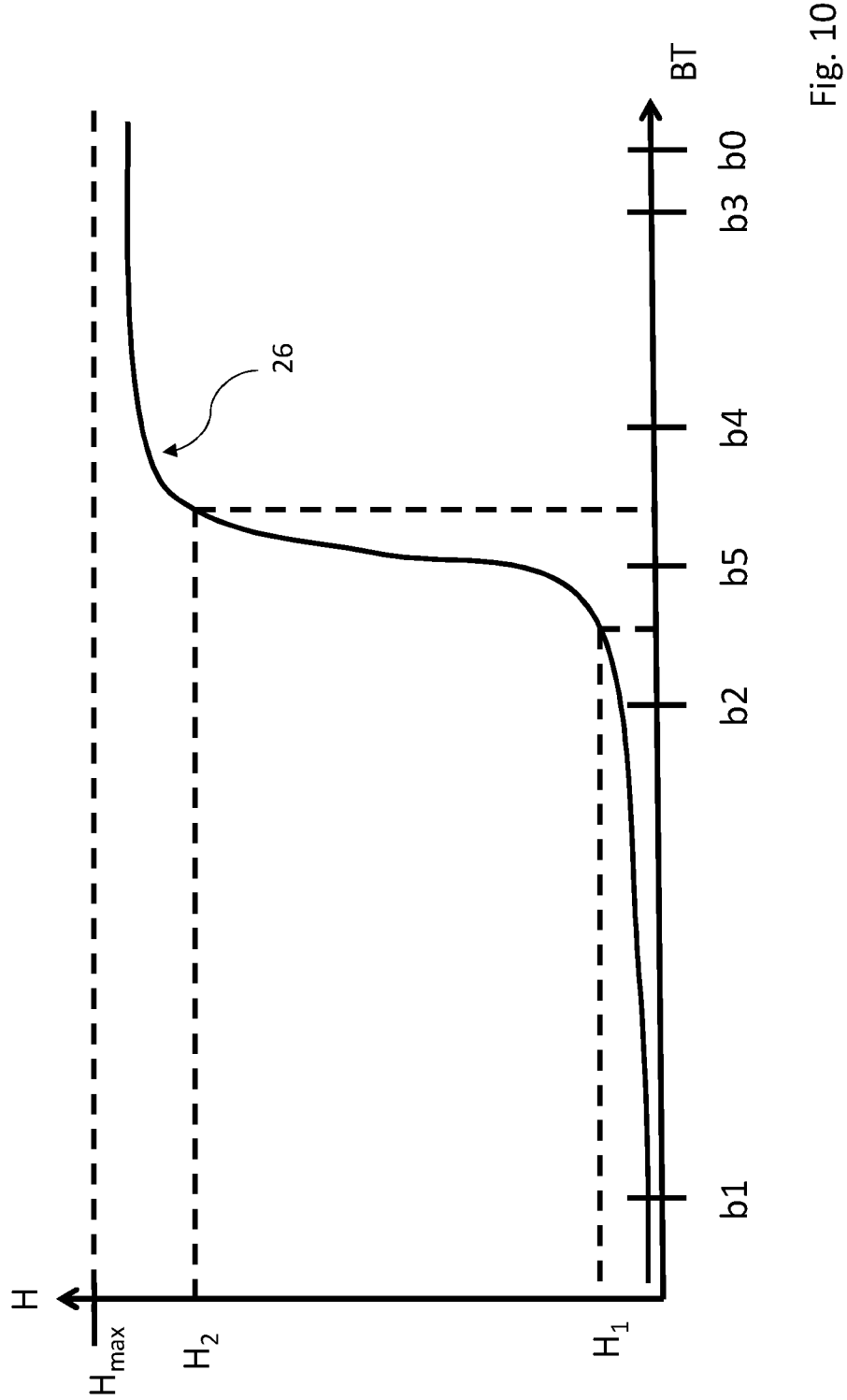
FIG. 10 shows a further advantageous embodiment of a characteristic line of the image brightness as a function of the exposure time of the sensor.

In FIG. 10, a characteristic line 26 is illustrated by way of example, which illustrates a modification of the characteristic line 26 from FIG. 8. The exposure times b0, b1, b2, b3 and b4 should in this case have led in an analogous manner by means of the method to the capture of a corresponding control image by means of the image sensor 6. However, the exposure time b4 from FIG. 10 differs from the exposure time b4 from FIG. 8 in that a control image of the capturing region 8 is also captured with the exposure time b4 from FIG. 10, which control image is furthermore larger than the second brightness limit value $H_2$.

It has therefore been established as advantageous that the exposure time in the partial step m) of the step V5) of the method is updated by means of the control unit 10 by means of an average value of the last exposure time b4 and the antepenultimate exposure time b2, if the last-determined measured brightness value is larger than the predetermined second brightness limit value $H_2$. This is because, in this case, the exposure time b5 is formed by the average value of the exposure times b4 and b2. This may, as illustrated by way of example in FIG. 10, lead to a control image of the recording space 8 being captured in step k) by means of the image sensor 6 with the exposure time b5, wherein the control image is used in the following step l), in order to determine the average brightness of this control image as a measured brightness value, which although it does not fulfil the conditions from step m), fulfils the conditions from step n), so that the control unit 10 switches to the first mode.

Figure 11:
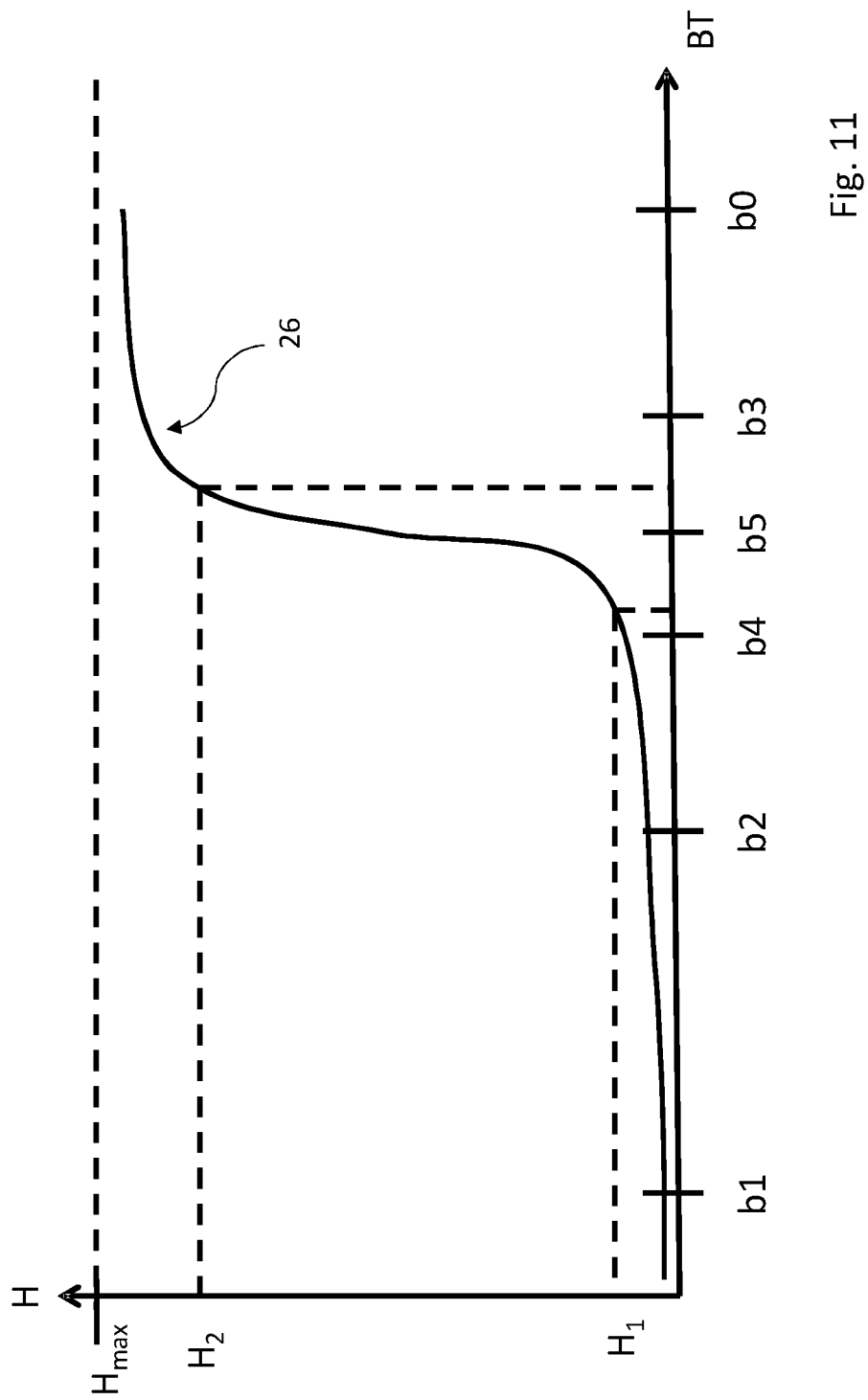
FIG. 11 shows a further advantageous embodiment of a characteristic line of the image brightness as a function of the exposure time of the image sensor.

In FIG. 11, a further possible case is illustrated, in which the last-mentioned exposure time b4 does not lead to a control image with an average brightness, which is larger than the second brightness limit value $H_2$, but rather in which the exposure time b4 leads to a control image, the average brightness of which is smaller than the first brightness limit value $H_1$. It has therefore been established as advantageous if the exposure time in the step m) is updated by means of the control unit 10 by means of a third average value of the last exposure time b4 and the penultimate exposure time b3, if the last-determined measured brightness value is smaller than the predetermined first brightness limit value $H_1$. As can be drawn by way of example from FIG. 11, this then leads in the case of the renewed execution of the steps k) to n) to it being possible even in this case to achieve a switch of the control unit 10 to the first mode.

Additionally, it is pointed out that "having" does not exclude other elements or steps and "a" does not exclude a multiplicity. Furthermore, it is pointed out that features, which have been described with reference to one of the above exemplary embodiments, may also be used in combination with other features of other above-described exemplary embodiments. Reference numbers in the claims are not to be seen as limiting.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A system comprising:
a camera with an image sensor for optically capturing a capturing region; and
a control unit for the camera,
wherein the control unit is configured to control the camera such that images are captured successively by the image sensor,
wherein the control unit is configured to switch between a first mode and a second mode,
wherein the control unit is configured to execute steps a) to d) repeatedly in groups in the first mode:
a) determining a brightness of the image last captured by the image sensor as a measured brightness value,
b) determining a new exposure time target value and/or a new sensor amplification target value based on the last determined measured brightness value,
c) updating of an exposure time for the image sensor by the last determined exposure time target value and/or of a sensor amplification of the image sensor by the last determined sensor amplification target value, and
d) controlling the camera, so that an image is captured by the image sensor with the last updated exposure time and/or last updated sensor amplification,
wherein the control unit is configured to detect a scene change in the capturing region in the first mode,
wherein the control unit is configured to switch from the first mode to the second mode when the scene change is detected,
wherein the control unit in the second mode is configured to update the exposure time for the image sensor by a predetermined exposure time reference value, to control the camera in such a manner that at least one control image is captured using the image sensor and to be able to switch back into the first mode thereafter.

2. The system according to claim 1, wherein the control unit is configured to update the sensor amplification for the image sensor by a predetermined sensor amplification reference value in the second mode.

3. The system according to claim 1, wherein the exposure time reference value is a time value between a predetermined minimum exposure time for the image sensor and 400-times the minimum exposure time.

4. The system according to claim 1, wherein the control unit is configured to read out an image data record from image data from the camera,
wherein the read-out image data of an image data record represent a captured image or control image,
wherein the control unit is configured to read out the image data record from the camera within a readout time, and
wherein the exposure time reference value corresponds to the readout time.

5. The system according to claim 1, wherein the control unit is configured to read out an image data record from image data from the camera,
wherein the read-out image data of an image data record represent a captured image or control image,
wherein the control unit is configured to read out the image data record from the camera within a readout time, and
wherein the exposure time reference value is a time value between a predetermined minimum exposure time for the image sensor and the readout time.

6. The system according to claim 1, wherein the control unit is configured to execute the steps e) to g) in the second mode repeatedly in groups after the exposure time is updated by the reference exposure time:
e) controlling the camera so that the or a further control image is captured by the image sensor with the last-updated exposure time;
f) determining a brightness of the control image last captured by the image sensor as a measured brightness value; and
g) updating the exposure time by increasing the exposure time in case that the last-determined measured brightness value is smaller than a predetermined first brightness limit value.

7. The system according to claim 6, wherein the control unit is configured to execute the steps e) to h) in the second mode repeatedly in groups, specifically with step h):
h) switching into the first mode for the control unit in case that the last-determined measured brightness value is larger than the predetermined first brightness limit value and smaller than a predetermined second brightness limit value, which is larger than the first brightness limit value.

8. The system according to claim 6, wherein the control unit is configured to update the exposure time in step g) such that the exposure time is increased by a predetermined iteration value.

9. The system according to claim 6, wherein the control unit is configured to switch between the first mode, the second mode and a third mode, and
wherein the control unit is configured to execute steps e) to i) in the second mode repeatedly in groups, specifically with step i):
i) switching into a third mode for the control unit in case that the last-determined measured brightness value is larger than the predetermined second brightness limit value;
wherein the control unit is configured to execute step j) in the third mode:
j) updating the exposure time by a first average value of the last-updated exposure time and the exposure time updated therebefore;
wherein the control unit is configured to execute steps k) to n) repeatedly in groups in the third mode:

k) controlling the camera so that a further control image is captured by the image sensor with the last-updated exposure time;

l) determining a brightness of the control image last captured by the image sensor as a measured brightness value;

m) updating the exposure time by an increase of the exposure time in case that the last-determined measured brightness value is smaller than the predetermined first brightness limit value or updating the exposure time by a reduction of the exposure time in case that the last-determined measured brightness value is larger than the predetermined second brightness limit value; and n) switching to the first mode for the control unit in case that the last-determined measured brightness value is larger than the predetermined first brightness limit value and smaller than the predetermined second brightness limit value.

10. The system according to claim 9, wherein
the control unit is configured to update the exposure time in step m) by a second average value of the last exposure time and the antepenultimate exposure time in the event that the last-determined measured brightness value is larger than the predetermined second brightness limit value, and/or
the control unit is configured to update the exposure time in step m) by a third average value of the last exposure time and the penultimate exposure time in the event that the last-determined measured brightness value is smaller than the predetermined first brightness limit value.

11. The system according to claim 1, wherein the control unit is configured to determine the exposure time target value and/or the sensor amplification target value such that a product value is in a predetermined target range or a predetermined value, wherein the product value is the product of the exposure time target value and the sensor amplification target value standardized to a predetermined product maximum value.

12. The system according to claim 1, wherein the control unit is configured to detect the scene change in the capturing region based on the last-captured measured brightness value and a maximum brightness value saved by the control unit, if the last-captured measured brightness value is at least 90% of the maximum brightness value.

13. The system according to claim 1, wherein the control unit is configured to detect the scene change in the capturing region based on the last-captured measured brightness value and a maximum brightness value saved by the control unit, if the last-captured measured brightness value is at most 10% of the maximum brightness value.

14. The system according to claim 1, wherein the control unit is configured to detect the scene change in the capturing region based on the last-captured measured brightness value and a measured brightness value captured temporally before that.

15. The system according to claim 1, wherein the control unit is configured to detect the scene change in the capturing region based on a histogram of the last-captured image.

16. The system according to claim 1, wherein each image captured by the camera is subdivided into a multiplicity of pixels, wherein the control unit is configured to determine a first pixel count of pixels, the brightness value of which is in each case smaller than a first brightness limit value saved by the control unit, and
wherein the control unit is configured to detect the scene change based on the first pixel count.

17. The system according to claim 1, wherein each image captured by the camera is subdivided into a multiplicity of pixels, wherein the control unit is configured to determine a second pixel count of pixels, the brightness value of which is in each case larger than a second brightness limit value saved by the control unit, and
wherein the control unit is configured to detect the scene change based on the second pixel count.

18. A method comprising the steps:
V1) capturing an image by an image sensor configured for optical capture of a capturing region and forming a part of a camera, wherein the camera is controlled by a control unit, wherein the control unit is configured to switch between a first mode and a second mode;
V2) transferring the control unit into the first mode, in which the steps a) to d) of the method are executed repeatedly in groups by the control unit:
a) determining a brightness of the image last captured by the image sensor as a measured brightness value,
b) determining a new exposure time target value and/or a new sensor amplification target value based on the last determined measured brightness value,
c) updating an exposure time for the image sensor by the last determined exposure time target value and/or of a sensor amplification of the image sensor by the last determined sensor amplification target value, and
d) controlling the camera, so that an image is captured by the image sensor with the last updated exposure time and/or last updated sensor amplification,
V3) checking at least the last-captured image by the control unit, if the control unit is in the first mode, for detecting a scene change in the capturing region,
V4) transferring the control unit from the first mode into the second mode, if the scene change is detected, wherein the exposure time for the image sensor is updated in the second mode of the control unit by a predetermined exposure time reference value;
V5) controlling the camera by the control unit in the second mode, so that at least one control image is captured by the image sensor with the last-updated exposure time; and
V6) transferring the control unit from the second mode to the first mode after completion of step V5).

19. The method according to claim 18, wherein, in step V4), the sensor amplification for the image sensor is updated by a predetermined sensor amplification reference value.

20. The method according to claim 18, wherein the exposure time reference value is a time value between a predetermined minimum exposure time for the image sensor and 400-times the minimum exposure time.

* * * * *